US012784394B2

(12) United States Patent
Kim et al.

(10) Patent No.: US 12,784,394 B2
(45) Date of Patent: Nov. 3, 2026

(54) METHOD OF IDENTIFYING AND COLORIZING PARTIALLY COLORIZED IMAGE AND ELECTRONIC DEVICE

(71) Applicant: Samsung Electronics Co., Ltd., Suwon-si (KR)

(72) Inventors: Kyuwon Kim, Suwon-si (KR); Akshay Janardan Bankar, Bangalore (IN); Mrinmoy Sen, Bangalore (IN); Ravikiran Kundapur Subraya, Bangalore (IN); Hyunsoo Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 219 days.

(21) Appl. No.: 18/672,606

(22) Filed: May 23, 2024

(65) Prior Publication Data

US 2025/0218064 A1 Jul. 3, 2025

Related U.S. Application Data

(63) Continuation of application No. PCT/KR2024/005860, filed on Apr. 30, 2024.

(30) Foreign Application Priority Data

Dec. 29, 2023 (IN) ............................ 202341090025
Jan. 2, 2024 (KR) ........................ 10-2024-0000532
Feb. 28, 2024 (KR) ........................ 10-2024-0029108

(51) Int. Cl.
*G06V 10/26* (2022.01)
*G06T 7/90* (2017.01)
(Continued)

(52) U.S. Cl.
CPC ................ *G06V 10/26* (2022.01); *G06T 7/90* (2017.01); *G06T 11/10* (2026.01); *G06T 11/60* (2013.01);
(Continued)

(58) Field of Classification Search
CPC ......... G06T 11/001; G06T 7/90; G06T 11/60; G06T 2207/10024; G06V 10/764
See application file for complete search history.

(56) References Cited

U.S. PATENT DOCUMENTS 7,961,938 B1 * 6/2011 Remedios ............... G06T 11/60 382/165
10,510,281 B2 12/2019 Shin et al.
(Continued)

FOREIGN PATENT DOCUMENTS

CN 102214364 A 10/2011
CN 105761292 A 7/2016
(Continued)

OTHER PUBLICATIONS

Search Report and Written Opinion dated Sep. 23, 2024 issued in International Patent Application No. PCT/KR2024/005860.

*Primary Examiner* — Said Broome
*Assistant Examiner* — Denis Vasiliy Minko
(74) *Attorney, Agent, or Firm* — Nixon & Vanderhye, P.C.

(57) ABSTRACT

An electronic device may include at least one display, at least one processor, and a memory configured to store instructions. The instructions, when executed by at least one processor, individually and/or collectively may cause the electronic device to: identify whether an input original image is a partially colorized image with an emphasized specific color in a black-and-white background or a monochrome background on the basis of colorfulness, and create
(Continued)

a tinted color image in an entire area of the original image; determine a weight corresponding to the original image and a weight corresponding to the color image; and synthesize the input original image and the color image based on the determined weights.

20 Claims, 13 Drawing Sheets

(51) Int. Cl.
*G06T 11/10* (2026.01)
*G06T 11/60* (2026.01)
*G06V 10/764* (2022.01)

(52) U.S. Cl.
CPC .................. *G06V 10/764* (2022.01); *G06T 2207/10024* (2013.01)

(56) References Cited

U.S. PATENT DOCUMENTS

| | | | | |
|---|---|---|---|---|
| 10,997,752 | B1 * | 5/2021 | Yoo | G06T 11/00 |
| 11,087,504 | B2 | 8/2021 | Cotado et al. | |
| 11,334,973 | B2 | 5/2022 | Du et al. | |
| 11,854,119 | B2 | 12/2023 | Khodadadeh et al. | |
| 2014/0306999 | A1 | 10/2014 | Yim et al. | |
| 2016/0140722 | A1 * | 5/2016 | Sunkavalli | G06T 7/11 382/164 |
| 2017/0374281 | A1 | 12/2017 | Kim et al. | |
| 2019/0158796 | A1 * | 5/2019 | Wang | H04N 23/88 |
| 2019/0362478 | A1 * | 11/2019 | Nanda | G06T 5/40 |
| 2020/0098144 | A1 | 3/2020 | Norouzi et al. | |
| 2022/0301227 | A1 | 9/2022 | Kanazawa | |
| 2023/0057757 | A1 * | 2/2023 | Matsuoka | H04N 1/644 |
| 2023/0064450 | A1 * | 3/2023 | Hiskens | G06T 5/50 |
| 2023/0316575 | A1 | 10/2023 | Bhardwaj et al. | |

FOREIGN PATENT DOCUMENTS

| | | | | | |
|---|---|---|---|---|---|
| CN | 107730568 | A | | 2/2018 | |
| CN | 108564632 | | | 9/2018 | |
| CN | 110263604 | A | * | 9/2019 | G06F 18/214 |
| JP | 2016-207101 | | | 12/2016 | |
| JP | 6366935 | B2 | | 7/2018 | |
| JP | 6986438 | | | 12/2021 | |
| JP | 2022547769 | A | | 11/2022 | |
| KR | 10-0757914 | | | 9/2007 | |
| KR | 10-2014-0122952 | | | 10/2014 | |
| KR | 10-1600587 | | | 3/2016 | |
| KR | 10-2018-0001254 | | | 1/2018 | |
| KR | 10-2427657 | | | 8/2022 | |

* cited by examiner

METHOD OF IDENTIFYING AND COLORIZING PARTIALLY COLORIZED IMAGE AND ELECTRONIC DEVICE

CROSS-REFERENCE TO RELATED APPLICATIONS

This application is a continuation of International Application No. PCT/KR2024/005860 designating the United States, filed on Apr. 30, 2024, in the Korean Intellectual Property Receiving Office and claiming priority to Korean Patent Application Nos. 10-2024-0000532, filed on Jan. 2, 2024, and 10-2024-0029108, filed on Feb. 28, 2024, in the Korean Intellectual Property Office, and to Indian Provisional Patent Application No. 202341090025, filed on Dec. 29, 2023, in the Indian Patent Office, the disclosures of each of which are incorporated by reference herein in their entireties.

BACKGROUND

Field

The disclosure relates to an electronic device, and for example, to a method of identifying partially colorized images (e.g., color-pop images) and colorizing the partially colorized images and an electronic device for performing the method.

Description of Related Art

Electronic devices may display, store, and edit photographs using image applications. The electronic device may create partially colorized images (e.g., color-pop images) by gray-scaling the background to emphasize some specific persons, objects (products), messages, or colors in a color photograph and share the same through social media and advertisement. In the present disclosure, the partially colorized image may refer, for example, to an image in which a background area is black, gray, or monochrome (monochrome) and only a specific area is emphasized in color.

In case that grayscale images are colorized using image colorization techniques including machine learning-based techniques, unique colorful color information, which is present in color-emphasized areas in an original picture, may be lost. In this case, the diversity and details of the original colors may be reduced or weakened.

SUMMARY

Embodiments of the disclosure provide an electronic device that may automatically identify whether a given image is a partially colorized image (e.g., color-pop image). In case the original image is a partially colorized image, the electronic device may automatically colorize the non-emphasized area (e.g., gray display area) while maintaining the emphasized color of the original image. For example, the electronic device according embodiments of the disclosure may perform colorization on a background portion while maintaining the rich, vivid color of the partially colorized image.

According to an example embodiment, an electronic device may include: at least one display, at least one processor, comprising processing circuitry, and a memory configured to store instructions. The instructions, when executed by at least one processor, individually and/or collectively, may control the electronic device to: allow the electronic device to identify whether an input original image is a partially colorized image with an emphasized specific color in a black-and-white background or a monochrome background based on colorfulness, create a tinted color image in an entire area of the original image, determine a weight corresponding to the original image and a weight corresponding to the color image, and synthesize the input original image and the color image based on the determined weights.

According to an example embodiment, an electronic device may include: at least one display, at least one processor, comprising processing circuitry, and a memory configured to store instructions. The colorfulness may include a first index made by quantifying the colorfulness for the entire area of the original image, and a second index made by quantifying the colorfulness for the specific area of the original image. The instructions, when executed by at least one processor, individually and/or collectively, may control the electronic device to: allow the electronic device to identify whether an input original image is a partially colorized image with an emphasized specific color in a black-and-white background or a monochrome background based on colorfulness, and determine that the original image is the partially colorized image based on a first index having a value equal to or greater than a first value and less than a second value relatively larger than the first value, a second index being greater than a third value, and a difference between the second index and the first index being larger than a fourth value.

According to an example embodiment, a method of operating an electronic device may include: identifying whether an input original image is a partially colorized image with an emphasized specific color in a black-and-white background or a monochrome background based on colorfulness, creating a tinted color image in an entire area of the original image, determining a weight corresponding to the original image and a weight corresponding to the color image, and synthesizing the input original image and the color image based on the determined weight.

The electronic device according to various example embodiments may identify whether the original image is a partially colorized image (e.g., a color-pop image, a tinted image, or a grayscale image) and automatically recommend whether to perform colorization depending on the type of image.

In addition, the electronic device according to various example embodiments may perform the colorization on the remaining background portion while maintaining the emphasized portion of the original image based on a selection. The above and other aspects, features and advantages of certain embodiments of the present disclosure will be more apparent from the following detailed description, taken in conjunction with the accompanying drawings, in which:

DETAILED DESCRIPTION

Figure 1:
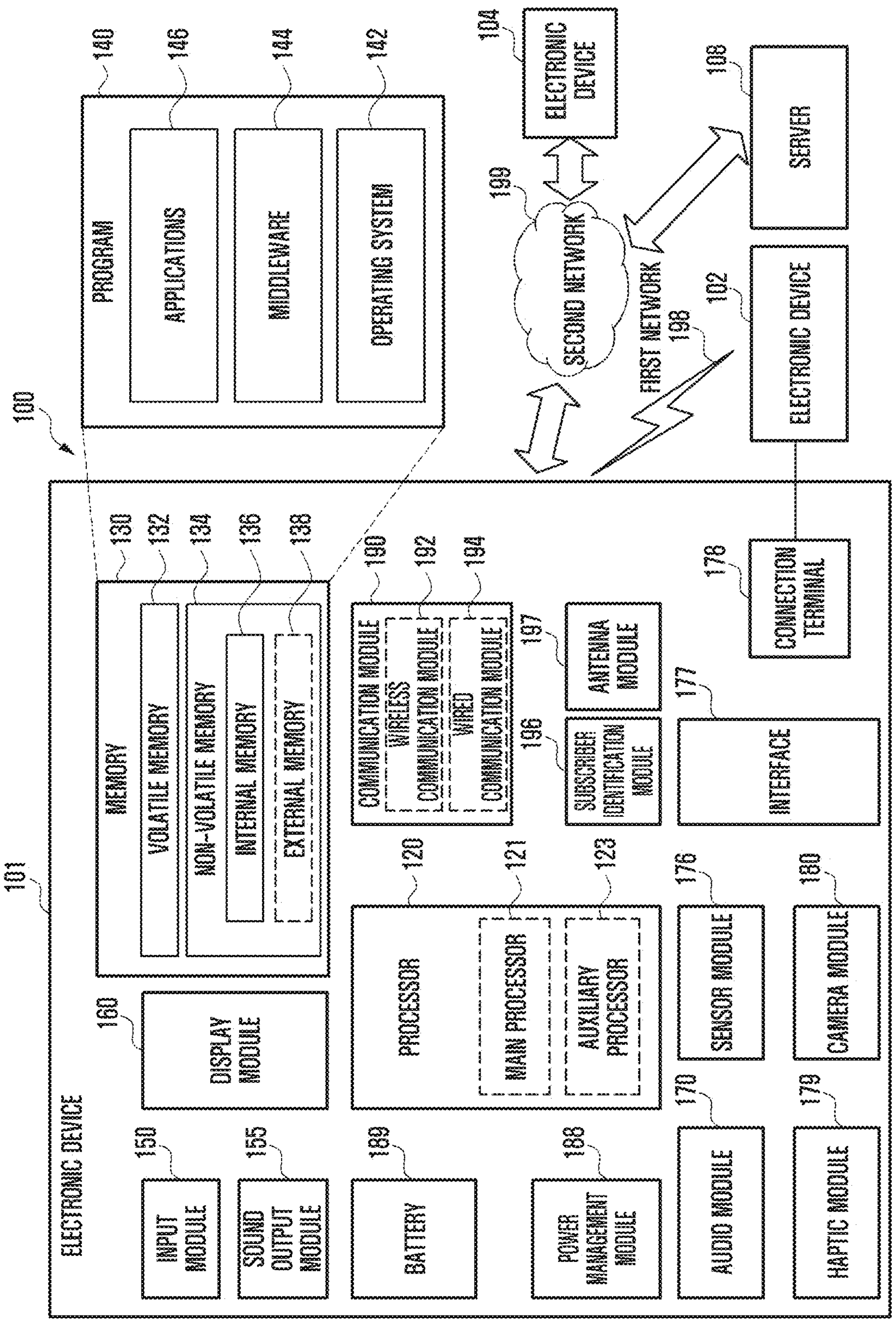
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module

176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
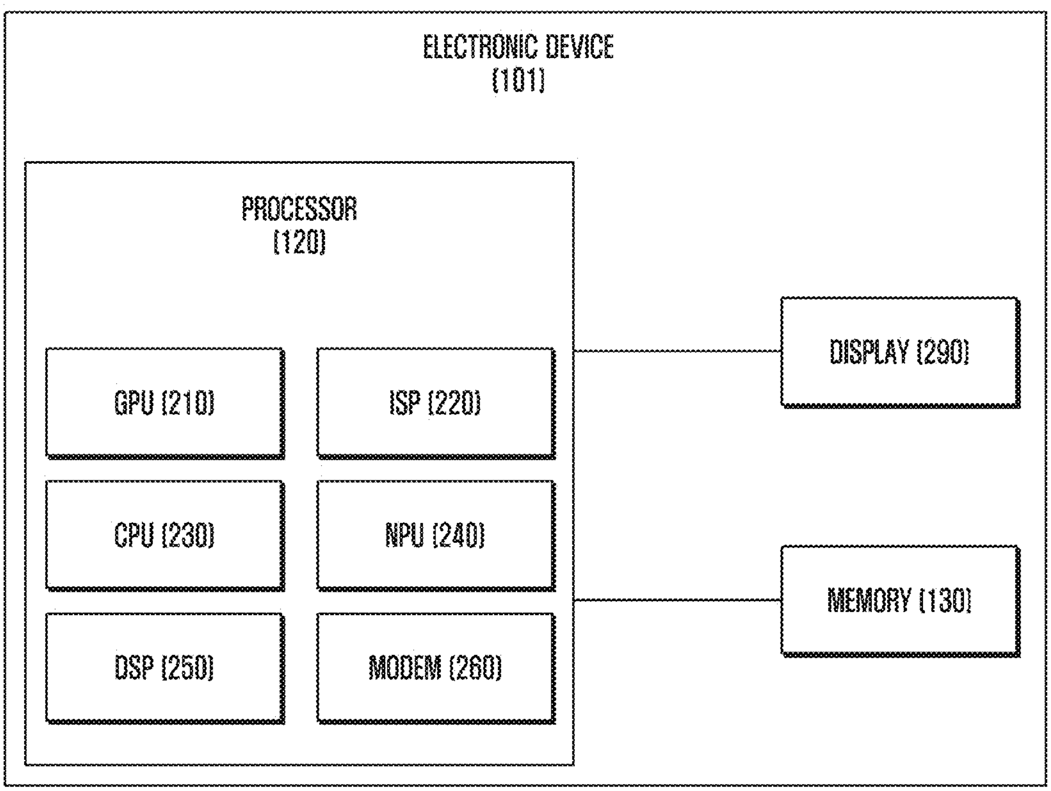
FIG. 2 is a block diagram illustrating an example configuration of the electronic device according to various embodiments.

FIG. 2 is a block diagram illustrating an example configuration of the electronic device according to various embodiments.

With reference to FIG. 2, the electronic device 101 according to an embodiment of the present disclosure may include a display 290 (e.g., the display module 160 in FIG. 1), the memory 130 (e.g., the memory 130 in FIG. 1), and/or the processor (e.g., including processing circuitry) 120 (e.g., the processor 120 in FIG. 1). According to an embodiment, the electronic device 101 may include all or at least some of the components of the electronic device 101 as described in the description with reference to FIG. 1.

According to an embodiment, the display 290 may include the components similar or identical to those of the display module 160 in FIG. 1. According to an embodiment, the display 290 may include one or more displays depending on the form factor of the electronic device 101 and provide various visual information to the outside (e.g., users) of the electronic device 101 through the corresponding display. According to an embodiment, under the control of the processor 120, the display 290 may visually provide executable applications (e.g., the application 146 in FIG. 1) and various information (e.g., content, images (e.g., still images, videos, animation images) (e.g., graphics interchange format (GIF) images and webp images)) related to the use of the applications.

According to an embodiment, the display 290 may be coupled to a touch sensor, a pressure sensor capable of measuring intensity of touch, and/or a touch panel (e.g., digitizer) configured to detect a stylus pen in a magnetic field manner. According to an embodiment, the display 290 may detect a touch input and/or hovering input (or proximity input) by measuring changes in signals (e.g., voltages, light amount, resistance, electromagnetic signals, and/or charge quantities) related to a specific position of the display 290 on the basis of the touch sensor, the pressure sensor, and/or the touch panel. According to an embodiment, the display 290 may include, for example, and without limitation, a liquid crystal display (LCD) device, an organic light-emitting diode (OLED), and/or an active matrix organic light-emitting diode (AMOLED). According to an embodiment, the display 290 may include a flexible display.

In an embodiment, the type, shape, and/or size of the display 290 are not limited to the aforementioned example and may be variously implemented in accordance with the form factor of the electronic device 101.

According to an embodiment, the memory 130 may be connected to the memory 130 in FIG. 1. According to an embodiment, the memory 130 may store various data used by the electronic device 101. In an embodiment, for example, the data may include input data or output data related to the application (e.g., the program 140 in FIG. 1) and commands related to the application. In an embodiment, the data various types of image data acquired by the camera module 180 or acquired from an external device (e.g., another electronic device and/or server). In an embodiment, the image data may include still images, videos, and/or animation images (e.g., graphics interchange format (GIF) images and/or webp images).

In an embodiment, the data may include various learning data and parameters acquired on the basis of the user's learning by means of interaction with the user. In an embodiment, the data may include various schema (or algorithms, models, networks, or functions) for supporting operations related to image configurations such as a wallpaper and/or a lock screen.

For example, the schema for supporting the operations related to the image configurations such as the wallpaper and/or a lockscreen may include a neural network. In an embodiment, the neural network may include, for example, and without limitation, a neural network model based on at least one of an artificial neural network (ANN), a convolution neural network (CNN), a region with convolution neural network (R-CNN), a region proposal network (RPN), a recurrent neural network (RNN), a stacking-based deep neural network (S-DNN), a state-space dynamic neural network (S-SDNN), a deconvolution network, a deep belief network (DBN), a restricted boltzman machine (RBM), a long short-term memory (LSTM) network, a classification network, a plain residual network, a dense network, a hierarchical pyramid network, and/or a fully convolutional network, or the like. According to an embodiment, the type of neural network model is not limited to the above-mentioned example.

According to an embodiment, the memory 130 may store instructions configured to allow the processor 120 to operate when executed. For example, the application may be stored as software (e.g., the program 140 in FIG. 1) in the memory 130 and executed by the processor 120. According to an embodiment, the application may be various applications capable of providing various functions or services (e.g., wallpaper and/or locks screen configuration functions) in the electronic device 101.

According to an embodiment, the processor 120 may include various processing circuitry and perform application layer processing functions required by the user of the electronic device 101. According to an embodiment, the processor 120 may provide control and commands of the functions for various blocks of the electronic device 101. According to an embodiment, the processor 120 may control the components of the electronic device 101 and/or perform computation or data processing related to communication. For example, the processor 120 may include at least some of the configurations and/or functions of the processor 120 in FIG. 1. According to an embodiment, the processor 120 may be operatively connected to elements of the electronic device 101. According to an embodiment, the processor 120 may load commands or data, which are received from another element of the electronic device 101, into the memory 130, process the commands or data stored in the memory 130, and store resulting data. The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

According to an embodiment of the present disclosure, the processor 120 may include processing circuitry and/or executable program elements.

According to an embodiment, the processor 120 may perform an operation of analyzing an overall image frame of an image. According to an embodiment, the processor 120 may perform an operation of determining a main object based on the overall image frame. According to an embodiment, when the main object is determined from the image, the processor 120 may perform an operation of identifying the remaining object, which excludes the main object from the image, as a background object. According to an embodiment, the processor 120 may perform an operation of separating the main object and the background object as independent objects in the image.

According to an embodiment, the detailed operations of the processor 120 of the electronic device 101 will be described in greater detail below with reference to the drawings.

According to an embodiment, the processor 120 may be an application processor (AP). According to an embodiment, the processor 120 may be a system semiconductor that serves to perform computation and multimedia operating functions of the electronic device 101. According to an embodiment, the processor 120 may include a technology-intensive semiconductor chip provided in the form of a system-on-chip (SoC) and made by integrating multiple semiconductor technologies into a single technology and implementing system blocks into a single chip. According to an embodiment, as illustrated in FIG. 2, the system blocks of the processor 120 may include a graphic processing unit (GPU) 210, an image signal processor (ISP) 220, a central processing unit (CPU) 230, a neural processing unit (NPU) 240, a digital signal processor 250, each of which may include various processing circuitry and/or executable program instructions, and a modem 260.

The graphic processing unit (GPU) 210, the image signal processor (ISP) 220, the central processing unit (CPU) 230, the neural processing unit (NPU) 240, the digital signal processor 250, and the modem 260 are illustrated as being included in the processor 120 but may be configured separately from the processor 120 and included in the electronic device 101.

According to an embodiment, the GPU 210 may serve to process graphics. According to an embodiment, the GPU 210 may receive a command from the CPU 230 and perform graphic processing for displaying shapes, positions, colors, shading, motions, and/or texture of items (or objects) on the display.

According to an embodiment, the ISP 220 may serve to perform image processing and correction on images and videos. According to an embodiment, the ISP 220 may serve to create images having shapes preferred by the user by correcting unprocessed data (e.g., raw data) transmitted from an image sensor of the camera module 180. According to an embodiment, the ISP 220 may perform a post-process such as a process of adjusting partial brightness of an image and emphasizing details. For example, the ISP 220 may produce results preferred by the user by performing image quality tuning and correcting processes on images acquired by the camera module 180.

According to an embodiment, the ISP 220 may operate in conjunction with the NPU 240 and support a scene segmentation (e.g., image segmentation) technology that recognizes and/or classifies portions of a scene being captured. For example, the ISP 220 may include functions of processing objects, such as sky, bushes, and/or skin by applying different parameters to the objects. According to an embodiment, the ISP 220 may use artificial intelligence functions to detect and display a human face when an image is captured or to adjust brightness, focal points, and/or colors the image using coordinates and information of the face.

According to an embodiment, the CPU 230 may perform functions corresponding to those of the processor 120. According to an embodiment, the CPU 230 may serve to decode the user's command and perform arithmetic and logic operations and/or data processing. For example, the CPU 230 may perform functions such as memory, interpretation, computation, and control. According to an embodiment, the CPU 230 may control overall functions of the electronic device 101. For example, on an operating system (OS), the CPU 230 may execute all software (e.g., applications) of the electronic device 101 and control hardware devices.

According to an embodiment, the CPU 230 may include a single processor core (single core) or a plurality of processor cores (multi-core). According to an embodiment, the CPU 230 may control the overall operations of the processor 120 to execute applications and perform neural network-based tasks required for the execution of the applications.

According to an embodiment, the NPU 240 may perform processing optimized for deep-learning algorithms of artificial intelligence. According to an embodiment, the NPU 240 may quickly and efficiently process big data, like a human neural network using a processor optimized for deep-learning algorithm computation (e.g., artificial intelligence computation). For example, the NPU 240 may be mainly used for artificial intelligence computation. According to an embodiment, the NPU 240 may serve to recognize objects, environments, and/or persons in the background at the time of capturing images using the camera module 180 and automatically adjusting focal points, automatically switching an image capturing mode of the camera module 180 to a food mode at the time of capturing food photographs, and/or removing only unnecessary subjects from the captured resulting product.

According to an embodiment, the electronic device 101 may support integrated machine learning processing by interacting with all the processors such as the GPU 210, the ISP 220, the CPU 230, and the NPU 240.

According to an embodiment, the DSP 250 may represent an integrated circuit that assists in quickly processing digital signals. According to an embodiment, the DSP 250 may perform high-speed processing by converting analog signals into digital signals.

According to an embodiment, the modem 260 may serve to enable the electronic device 101 to use various communication functions. For example, the modem 260 may support communication such as process of transmitting or receiving calls and data while sending and receiving signals to and from base stations. According to an embodiment, the modem 260 may include an integrated modem (e.g., a cellular modem, an LTE modem, a 5G modem, and a 5G-advanced modem, and a 6G modem) that supports communication technologies such as LTE and 2G to 5G. According to an embodiment, the modem 260 may include an artificial intelligence modem that adopts artificial intelligence algorithms.

According to an embodiment, the operations performed by the processor 120 may be implemented on a recording medium (or a computer program product). For example, the recording media may include a non-transitory computer-readable recording medium that records a program for executing various operations to be performed by the processor 120.

Various example embodiments described in the present disclosure may be implemented in a recording medium readable by a computer or a similar device using software, hardware, or a combination thereof. In terms of hardware implementation, the operations described in the disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, micro-processors, and/or other electrical units for performing functions.

In an embodiment, the recording medium (or computer program product) may include a non-transitory computer-readable recording medium that records a program for performing an operation of separating a main object and a background object in a given image, an operation of determining a display size of a designated display on which an image is to be displayed, an operation of editing (or modifying) the main object and the background object while corresponding to the display size, an operation of combining the edited main object and the edited background object to create an image edited to correspond to the display size of the designated display, and an operation of displaying the edited image on the designated display.

Figure 3:
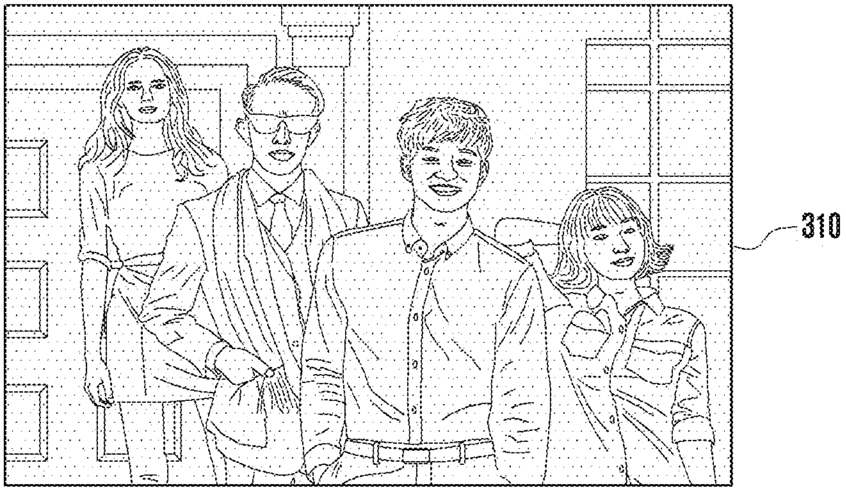
FIG. 3 is a diagram illustrating an example grayscale image and an example tinted image with different tones according to various embodiments.
Figure 3:
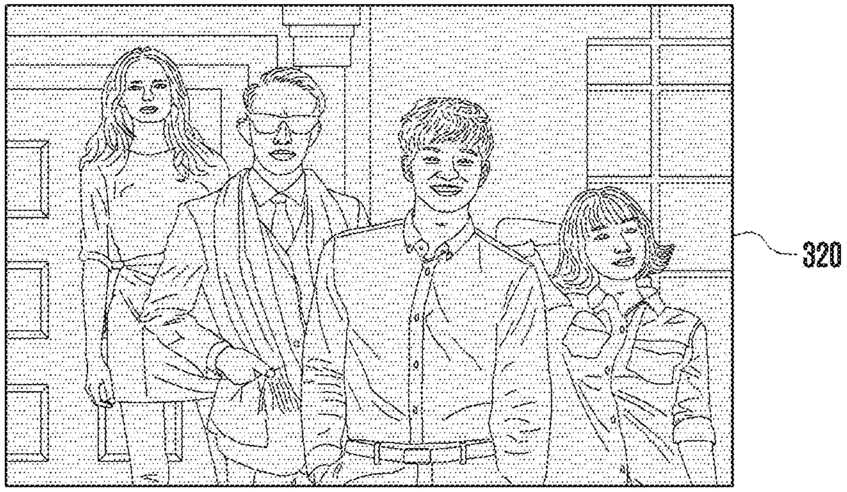

FIG. 3 is a diagram illustrating a grayscale image and a tinted image with different tones according to various embodiments.

The electronic device 101 may use a ratio of the number of pixels represented in gray to determine a partially colorized image. However, the grayscale image may not actually be gray but may be a tinted image to which a filter with a specific color tone is applied. Picture 310 in FIG. 3 illustrates a tinted image. Picture 320 in FIG. 3 illustrates an image with an overall tone of gray. Picture 320 may refer, for example, to a grayscale image in which values of R, G, and B channels are equal.

The tinted image may refer, for example, to an image in which the values of RGB channels in the pixels in the image are partially different. The tinted image may refer, for example, to an image that provides a new sense by imparting a specific color tone to the existing image. RGB may refer to the three primary colors, e.g., red, green, and blue. In order to apply the tint, the electronic device 101 may change the existing RGB channel values. For example, the electronic device 101 may increase the value of the Red channel and decrease the values of the Green and Blue channels to apply a red tint. In this case, the electronic device 101 may provide an effect that the entire original image is illuminated with red light.

On the other hand, the grayscale image may refer, for example, to an image represented in multiple tones between black and white by removing color information. All colors of the grayscale image are converted into grayscale, such that objects may be distinguished only by contrast, except for color information in the image. The tinted image may refer, for example, to an image in which a color tone is changed by overlaying a specific color on the original image. The electronic device 101 may provide an effect of changing overall sense of the image by changing the tone to a specific color without completely removing color information of the original image. There is a difference in that the tinted image retains color information of the original image, whereas the grayscale image does not have original color information and is represented by multiple tones between black and white. Therefore, there may actually be a difference in color information even though the tinted image and the grayscale image appear to be similar images.

In addition, in case that a subject in the image has a gray tone, the image may appear to be a grayscale image even though the colored image is captured. In this case, the electronic device 101 may have difficulty in determining whether the image is a color image or a grayscale image.

In the case of the tinted image such as picture 310 or in case that the subject in the image has a gray tone, it is difficult to distinguish between the captured image and the grayscale image. The electronic device 101 may have difficulty in determining, using a simple algorithm, whether the original image is a partially colorized image, a tinted image, or an image captured when the subject in the image has a gray tone.

Figure 4:
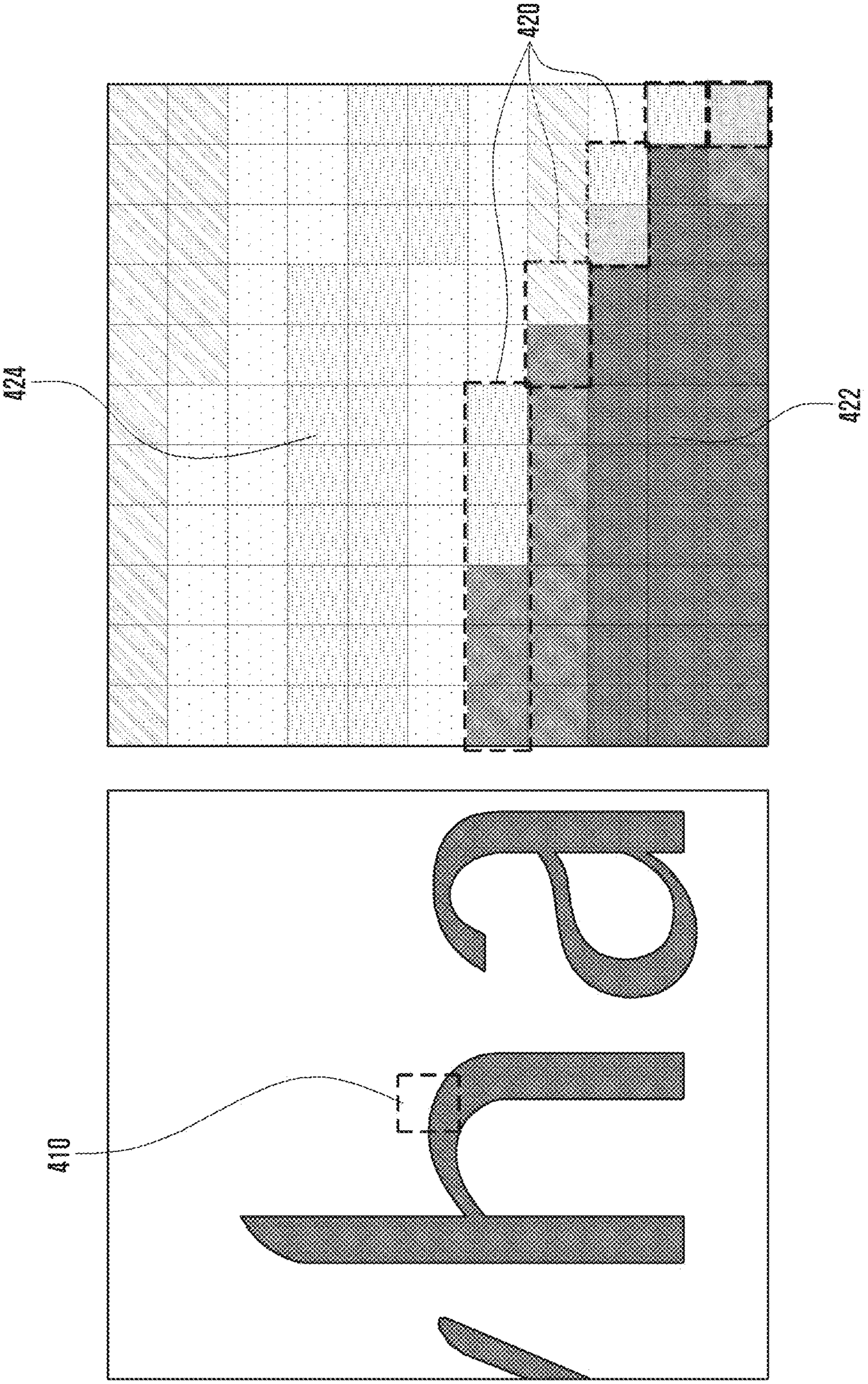
FIG. 4 is a diagram illustrating a background portion and a portion with an emphasized specific color in a partially colorized image according to various embodiments.

FIG. 4 is a diagram illustrating a background portion and a portion with an emphasized specific color in a partially colorized image according to various embodiments.

The alphabet representing h in a specific area 410 may be included in the portion with an emphasized specific color. The background portion may be disposed around the alphabet representing h. When the specific area 410 is observed in a pixel-by-pixel expansion, there may be an intermediate area 420 between a background area 424 and an area 422 with an emphasized specific color.

The background area 424 may be classified as a gray area. However, in the case of the intermediate area 420, a relatively high value of the R channel and a relatively low value of the G channel may be measured, like a tinted image, even though the intermediate area is not area 422 with an emphasized specific color.

As illustrated in FIG. 4, the electronic device 101 may have difficulty in clearly distinguishing the background area 424 and the area 422 with an emphasized specific color. Artifacts (e.g., smudges) may occur in case that the background area 424 is colored and synthesized with the original image in a state in which the background area 424 and the area 422 with an emphasized specific color are not distinguished. During an image synthesis process, the artifacts may refer, for example, to visual effects or errors that are not intended by the user. Artifacts may appear as a mosaic, as unnatural boundary lines, or as smudges that blur the surrounding image. Artifacts may degrade the quality of synthesized images. The artifacts will be described in greater detail below with reference to FIG. 7.

The electronic device 101 according to an embodiment may determine whether the original image is a partially colorized image using at least any one of a first index (global colorfulness) made by quantifying a degree of color richness perceived for the entire area of the original image, a second index (local colorfulness) made by quantifying a degree of color richness perceived for a specific area of the original image, and a proportion of the pixels in which an absolute value of a difference between the R, G, and B channels is larger than a predetermined value.

The first index (global colorfulness) may refer, for example, to a numerical value obtained by quantifying a degree of color richness that a person subjectively feels about the overall image. The first index (global colorfulness or colorfulness) may refer, for example, to a criterion indicating a score related to an overall color (colorfulness) for an image felt by a person. According to an embodiment, the first index (global colorfulness) will be described as having a value between 0% and 100%.

According to an embodiment, a machine learning model may extract a main color feature from an image, map the main color feature with a color (colorfulness), and then learn the main color feature. When an image is input, the machine learning model may provide the first index (global colorfulness) of the image as an output on the basis of learned information. For example, the main color feature may include color information (R, G, and B) or a specific color structure.

According to an embodiment, the second index (local colorfulness) may refer, for example, to an index for measuring color diversity of a specific area (e.g., local patch). For example, in a situation in which the original image is 512×512, the physical area may be divided into a size of 64×64, and the second index (local colorfulness) may be calculated. The size of the original image and the sizes of the separated areas are just examples and may vary depending on the configurations.

In addition, in case that a predetermined interest object is present in the image, the electronic device 101 may determine a specific area based on the area in which the interest object is positioned, instead of the physical area. For example, the interest object may include any one of a human face, a human body, or a pet. The interest object may vary depending on the configurations. The electronic device 101 may allow the machine learning model to learn, input an image to the learned machine learning model, and obtain coordinates of the area, in which the interest object is present, as an output. When the interest object is present in the image, an area corresponding to the interest object may be marked, and the machine learning model may learn using the marked portion. The machine learning model may learn a plurality of images including the interest object, whether the interest object is included in the input image may be determined, and the position of the interest object may be provided as an output.

According to an embodiment, in case that the colorfulness of the second index (local patch) included in at least a part of the image is relatively higher than the colorfulness of the first index (global colorfulness), the electronic device 101 may determine that the image is a partially colorized image (e.g., color-pop image).

According to an embodiment, a proportion of the pixel, in which an absolute value of a difference between the R, G, and B channels is larger than a predetermined value, may be referred to as a 'color pixel'. The color pixel may refer, for example, to the pixel in which a maximum size of the absolute value of the difference between the R, G, and B channels is larger than a first level (e.g., T). The first level T may vary depending on the configurations. The number of color pixels may decrease as the first level increases. The number of color pixels may increase as the first level decreases. The first level may refer, for example, to a hyperparameter value. The electronic device 101 may determine the first level from values between 2.5% to 10% of a maximum value of 255 that the number of 8 bits may have. According to an embodiment, a value of 7 is used for the first level. However, the value of the first level may be increased to classify a relatively more colorful object (e.g., image) as a partially colorized image. In addition, the electronic device 101 may determine the first level T between values of 26 to 102 in a color scheme having a depth of 10 bits.

Hereinafter, a method of identifying whether the original image is a partially colorized image will be described in greater detail with reference to the drawings.

Figure 5A:
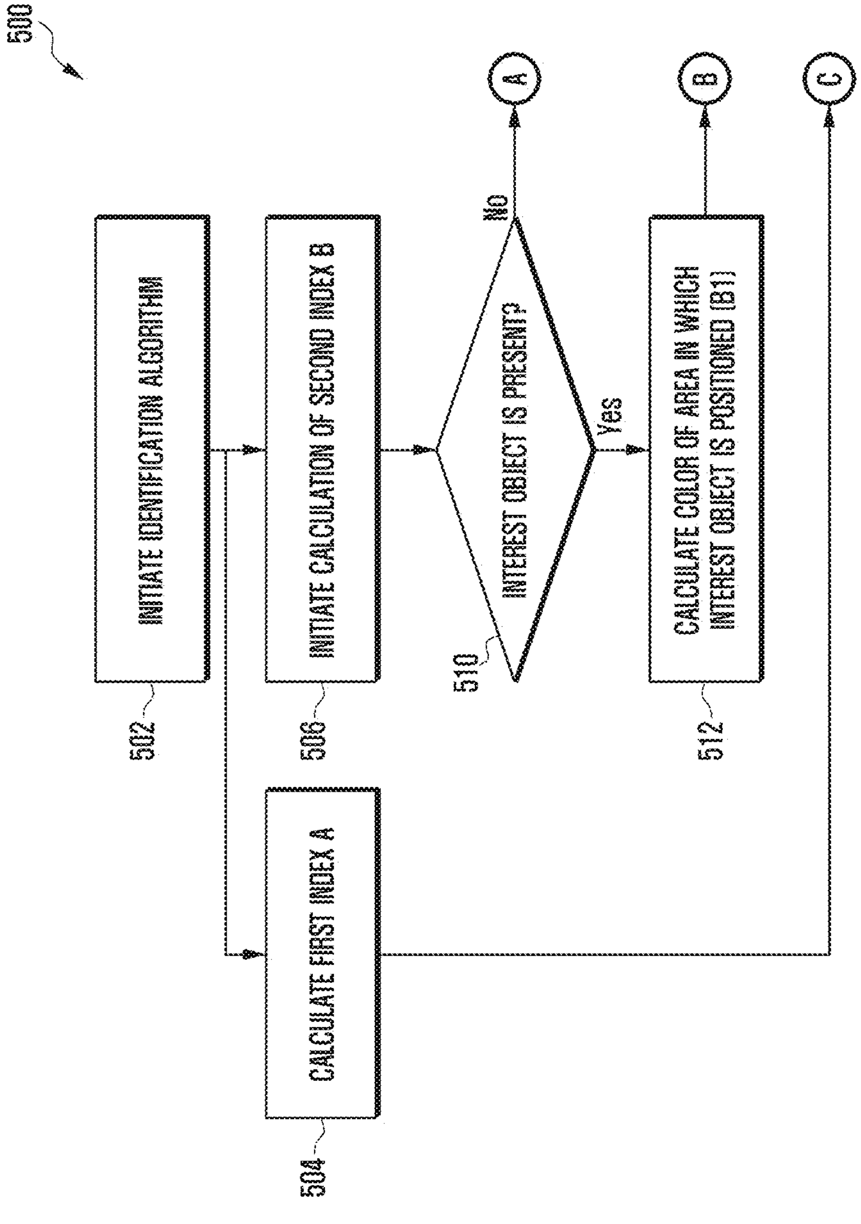
FIGS. 5A and 5B are flowcharts illustrating an example method of identifying a partially colorized image by the electronic device according to various embodiments.
Figure 5B:
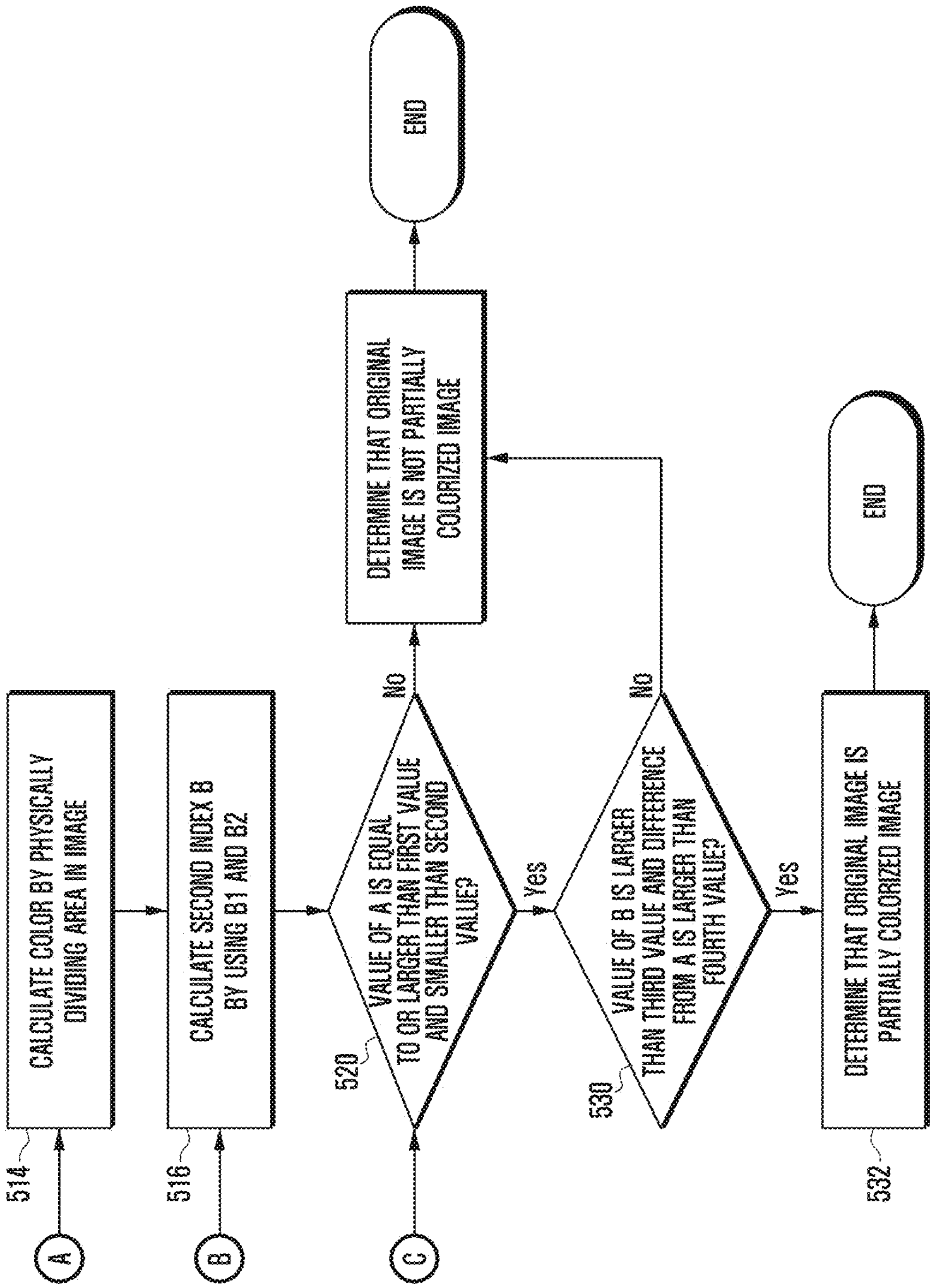

FIGS. 5A and 5B are flowcharts illustrating an example method of identifying a partially colorized image by the electronic device according to various embodiments.

The operations described with reference to FIGS. 5A and 5B may be implemented on the basis of instructions that may be stored in a computer recording medium or a memory (e.g., the memory 130 in FIG. 1). An illustrated method 500 may be performed by the electronic device (e.g., the electronic device 101 in FIG. 1) described above with reference to FIGS. 1, 2, 3 and 4 (which may be referred to as FIGS. 1 to 4), and a description of the above-mentioned technical feature may not be repeated here. The order of the operations in FIGS. 5A and 5B may be changed, some operations may be excluded, and some operations may be performed simultaneously.

At operation 502, the electronic device 101 may initiate an identification algorithm under the control of the processor (e.g., the processor 120 in FIG. 1). The identification algorithm may include any one of the calculation of the first index (global colorfulness), the calculation of the second index (local colorfulness), and the calculation of the proportion of the color pixel. The identification algorithm may include the calculation of the first index (global colorfulness) and the calculation of the second index (local colorfulness).

At operation 504, the electronic device 101 may calculate the first index A. The first index (global colorfulness) may refer, for example, to a numerical value obtained by quantifying a degree of color richness that a person subjectively feels about the overall image. According to an embodiment, the quantified numerical value may be defined by two types of methods. However, the present disclosure is not limited thereto.

For example, the colorfulness of the overall image may be measured on the basis of the experimental quantification (e.g., psychophysical category scaling experiment), or the degree of color richness may be quantified by the numerical value through learning based on the machine learning.

At operation 506, the electronic device 101 may initiate the calculation of the second index B. The second index (local colorfulness) may refer, for example, to an index for measuring color diversity of a specific area (e.g., local patch).

At operation 510, the electronic device 101 may identify whether the interest object is present. In case that a predetermined interest object is present in the image, the electronic device 101 may determine a specific area based on the area in which the interest object is positioned, instead of the physical area. For example, the interest object may include any one of a human face, a human body, or a pet. The interest object may vary depending on the configurations.

At operation 512, on the basis of the presence of the interest object, the electronic device 101 may calculate a color B1 in the area in which the interest object is positioned. The electronic device 101 may allow the machine learning model to learn, input an image to the learned machine learning model, and obtain coordinates of the area, in which the interest object is present, as an output. The electronic device 101 may calculate the colorfulness of the output coordinates and calculate the color B1 in the area in which the interest object is positioned.

At operation 514, on the basis of the absence of the interest object, the electronic device 101 may physically divide the area in the original image and calculate a color B2 of each area. For example, in a situation in which the original image is 512×512, the physical area may be divided into a size of 64×64, and the second index (local colorfulness) may be calculated. The size of the original image and the sizes of the separated areas are just examples and may vary depending on the configurations.

At operation 516, the electronic device 101 may calculate the second index B using the color B1 of the area in which the interest object is positioned and the color B2 of the physically separated areas.

At operation 520, the electronic device 101 may identify whether the value of the first index A is equal to or larger than the first value and simultaneously smaller than the second value. The first value may include G_min (%). The second value may include G_max (%). G_min may refer, for example, to a value that is a criterion of a minimum value related to the global colorfulness. G_max may refer, for example, to a maximum value related to global colorfulness.

For example, in order to classify the grayscale image, the electronic device 101 may adjust a reference numerical value to classify the images of various color areas as partially colorized images by increasing the numerical value of G_min or increasing the numerical value of G_max.

At operation 534, in case that the value of the first index A is smaller than the first value or equal to or larger than the second value, the electronic device 101 may determine that the original image is not the partially colorized image.

At operation 530, the electronic device 101 may identify whether the value of the second index B is larger than a third value and simultaneously a difference from the first index A and the second index B exceeds a fourth value in a situation in which the value of the first index A is equal to or larger than the first value and simultaneously smaller than the second value.

The third value may include L_max (%). The fourth value may include a value made by multiplying the value of the first index A by a specific ratio.

At operation 532, the electronic device 101 may determine that the original image is a partially colorized image on the basis that the value of the second index B is larger than the third value and simultaneously the difference from the first index A exceeds the fourth value in the situation in which the value of the first index A is equal to or larger than the first value and simultaneously smaller than the second value. According to an embodiment, the pixel, in which an absolute value of a difference between the R, G, and B channels is larger than a predetermined value, may be referred to as the 'color pixel'. The color pixel may refer, for example, to the pixel in which a maximum size of the absolute value of the difference between the R, G, and B channels is larger than a first level (e.g., T). According to an embodiment, the electronic device 101 may determine whether the color pixel is larger than a specific reference value, and the electronic device 101 may determine the partially colorized image only in case that the color pixel is smaller than the specific reference value.

At operation 534, the electronic device 101 may determine that the original image is not a partially colorized image on the basis that the value of the second index B is equal to or smaller than the third value or a difference between the value of the second index B and the value of the first index A is equal to or smaller than the fourth value.

According to an embodiment, a relatively larger number of images may be classified as grayscale images as the first value (G_min (%)) is configured to be larger by the electronic device 101. The electronic device 101 may increase the first value to decrease the probability that the original image is classified as a partially colorized image.

According to an embodiment, the image, which is classified as the partially colorized image, may have a relatively higher colorfulness as the second value (G_max (%)) is configured to be larger by the electronic device 101. As the second value (G_max (%)) is configured to be larger by the electronic device 101, the probability that the image having predetermined colorfulness is classified as the grayscale image instead of the partially colorized image may increase. The electronic device 101 may increase the second value to increase the probability that the original image is classified as a partially colorized image.

According to an embodiment, the image, which is classified as the partially colorized image, may have a relatively higher colorfulness as the third value (L_max) and the fourth value are configured to be larger by the electronic device 101. The electronic device 101 may perform control to increase the influence of the second index (local colorfulness), during the process of classifying the original image as a partially colorized image, by increasing the third value and the fourth value. The high influence of the second index may refer, for example, to a degree of color richness of a specific area being high.

Figure 6:
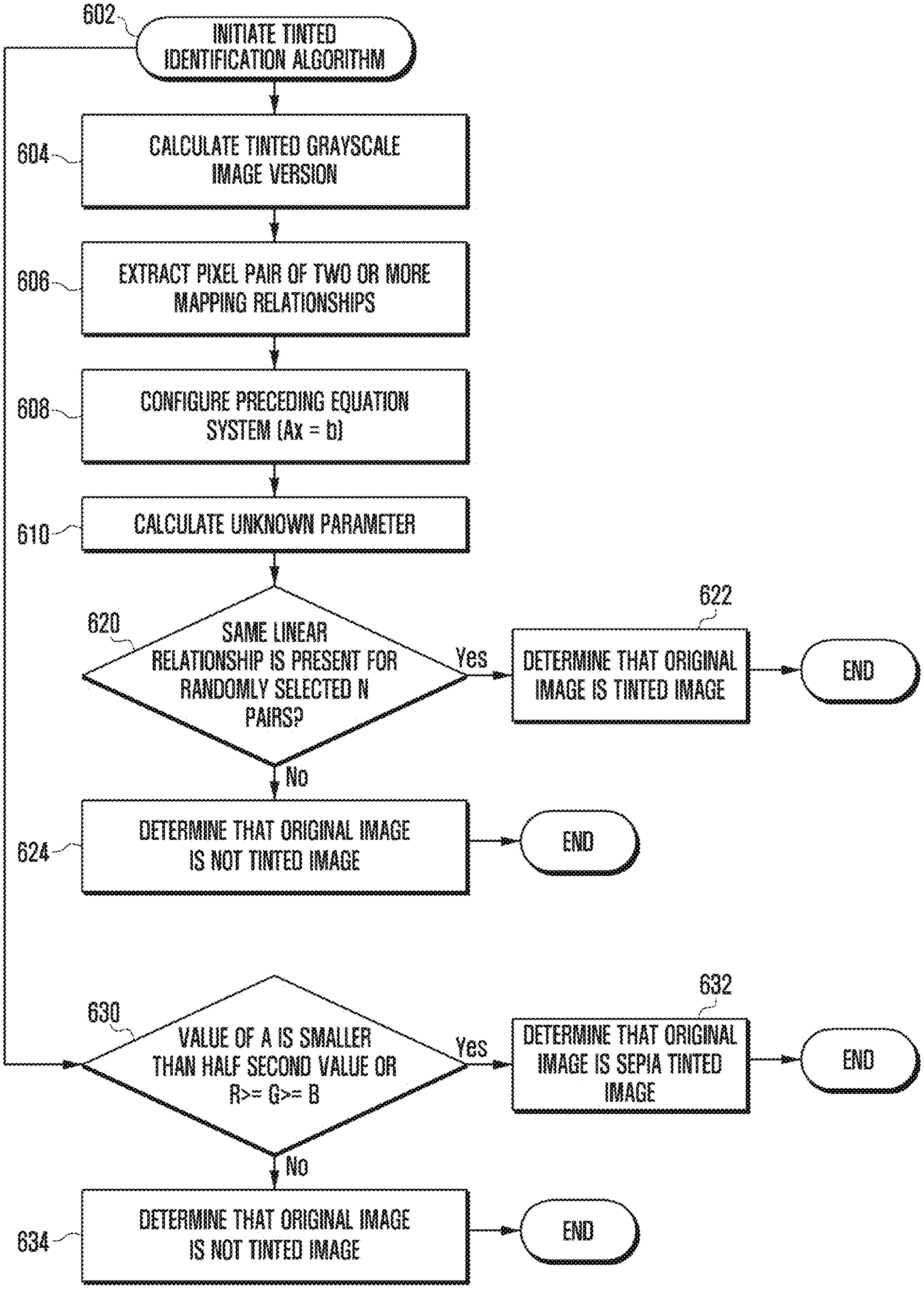
FIG. 6 is a flowchart illustrating an example method of identifying a tinted image by the electronic device according to various embodiments.

FIG. 6 is a flowchart illustrating an example method of identifying a tinted image by the electronic device according to various embodiments.

The operations described with reference to FIG. 6 may be implemented on the basis of instructions that may be stored in a computer recording medium or a memory (e.g., the memory 130 in FIG. 1). The illustrated method may be performed by the electronic device (e.g., the electronic device 101 in FIG. 5) described above with reference to FIGS. 1, 2, 3, 4, 5A and 5B, and a description of the above-mentioned technical feature may not be repeated here. The order of the operations in FIG. 6 may be changed, some operations may be excluded, and some operations may be performed simultaneously.

At operation 602, the electronic device 101 may initiate an identification algorithm for identifying a tinted image under the control of the processor (e.g., the processor 120 in FIG. 1).

At operation 604, the electronic device 101 may calculate an RGB value by changing the tinted image to an image of a grayscale version. The tinted image may refer, for example, to an image made by applying a three-channel filter having a specific color tone to a grayscale image. For example, a sepia tinted image may have a ratio of R, G, and B pixels with a value of 107:74:47. The electronic device 101 may create a sepia tinted image by multiplying the pixel of the grayscale image by (1.351, 1.203, and 0.937) that are coefficients having weights similar to the ratio of 107:74:47. The coefficients may refer, for example, to values used to apply specific conversion or algorithms in image processing. The above-mentioned value of the coefficient is just an example and may vary depending on the configurations. The electronic device 101 may modify the original image by adjusting the coefficients. For example, the electronic device 101 may multiply the R value of the specific pixel of the grayscale image by 1.351, multiply the G value by 1.203, and multiply the B value by 0.937. In case that the electronic device 101 obtains the value made by applying the coefficient to one pixel and obtains the value made by applying the coefficient to all the pixels, and the electronic device 101 may obtain the sepia tinted image from the grayscale image.

At operation 606, the electronic device 101 may extract a mapping relationship between the tinted image and the changed grayscale image on a pixel-by-pixel basis. The electronic device 101 may obtain the grayscale image from the tinted image using an average value of the channels.

According to an embodiment, the electronic device 101 may calculate the mapping relationship related to the RGB value of the pixel at the same position on the tinted image and the grayscale image. According to an embodiment, when the electronic device 101 obtains the mapping relationship, the electronic device 101 may obtain the mapping relationship between the grayscale image and the tinted image two or more sampled pixels.

In this case, the electronic device 101 may exclude 0 and 255, which are values that may cause clipping, from the calculation. Clipping may refer, for example, to a phenomenon that occurs in signal processing. The clipping may refer, for example, to a specific critical value being limited to a critical value when a magnitude of a signal is larger than or smaller than the specific critical value. Clipping may occur during a process of correcting colors or contrast of an image. When clipping occurs, some information of the image may be lost, which may cause a difference from the original image.

At operation 608, the electronic device 101 may configure a linear equation shape on the basis of the mapping relationship extracted on a pixel-by-pixel basis.

For example, Gray may be converted into RGB by a linear equation, and the RGB linear equation is as follows.

$$R = a * \text{Gray} + c_R$$

$$G = b * \text{Gray} + c_G$$

$$B = c * \text{Gray} + c_B$$

According to an embodiment, a, b, and c may respectively represent conversion coefficients related to red, green, and blue channels, and $c_{\_R}$, $c_{\_G}$, and $c_{\_B}$ may represent constant values to be added to the channels. For example, when the linear equation is represented in a matrix form, the coefficients and the constants may be calculated.

The electronic device 101 may prepare mapping of Gray values and RGB values. For example, the electronic device 101 may use multiple grayscale values (Gray1, Gray2, . . . ) and corresponding RGB values (R1, G1, B1, R2, G2, B2, . . . ).

$$b^T = [R1, G1, B1, R2, G2, B2, \ldots]$$

The electronic device 101 may configure a linear equation system A in a matrix form as follows.

At operation 610, the electronic device 101 may calculate a parameter related to the unknown. The unknown x to be obtained may be configured as follows.

$$x^T = [a, c_R, b, c_G, c, c_B]$$

For example, the linear equation may include a form of Ax=b.

At operation 620, the electronic device 101 may randomly select a predetermined number (e.g., n) of pairs and identify whether the selected pairs satisfy a linear equation. In this case, the pair may refer, for example, a pixel of the tinted image and a pixel of the changed grayscale image. The electronic device 101 may calculate x on the basis of the extracted value and identify whether the image is the tinted image created by the filter on the basis of the value of x.

At operation 622, the electronic device 101 may determine that the original image is a tinted image on the basis that the randomly selected pairs satisfy the linear equation. The tinted image may refer, for example, to an image in which the values of RGB channels in the pixels in the image are partially different. The tinted image may refer, for example, to an image that provides a new sense by imparting a specific color tone to the existing image. The electronic device 101 may randomly extract Gray_i and RGB_i of the n mapping relationships and identify whether the relationships are relationships that enables the conversion by the linear conversion x.

According to an embodiment, the electronic device 101 may calculate the mapping relationship and calculate the linear conversion to produce the tinted image from the grayscale image. For example, the linear conversion method may include a method such as a least square. The least square is a widely used method in statistics and linear algebra and may refer to finding the function that best fits the given data. The least square may calculate a difference between a predicted value of a function and an actual data value, square difference values, add the difference values, and find a function value that causes the sum to be minimized/reduced. The electronic device 101 may find the linear function, which indicates a relationship between the grayscale image and the tinted image, using the linear conversion method such as the least square.

According to an embodiment, the electronic device 101 may identify whether the derived linear conversion relationship is applied to the remaining pixels of the tinted image and the grayscale image.

According to an embodiment, the electronic device 101 may determine that the image is a tinted image instead of a grayscale image because the object is close to gray when the linear conversion is applied. The image, which is created by applying the linear conversion to grayscale, may not have various types of colors because of the nature of conversion. For example, the tinted image may be an image with a relatively low colorfulness and classified as an image that may be newly colored as a whole.

At operation 624, the electronic device 101 may determine that the original image is not a tinted image on the basis that the randomly selected pairs do not satisfy the linear equation.

According to an embodiment, the electronic device 101 may initiate a tint identification algorithm at operation 602 and perform operation 630. At operation 630, on the basis that randomly selected pairs do not satisfy the linear equation, the electronic device 101 may identify whether the value of the first index A is smaller than half the second value or the value of the R channel is equal to or larger than the value of the G channel and the value of the G channel is equal to or larger than the value of the B channel.

According to an embodiment, the electronic device 101 may define the tinted image using operation 630 without obtaining the linear relationship. Among the tinted images, a color in brown series of the sepia tinted image may be applied to the original image. Therefore, the electronic device 101 may classify the image as a sepia tinted image in case that the value of the first index A is smaller than half the second value, the value of the R channel is equal to or larger than the value of the G channel, and simultaneously the value of the G channel is equal to or larger than the value of the B channel. The first index A may refer, for example, to the global colorfulness. The second value may include G_max (%).

At operation 632, the electronic device 101 may determine that the original image is a sepia tinted image, for example, on the basis that the condition of operation 630 is satisfied. The sepia tinted image is merely an example, and a tinted image with another color may be included. The sepia tinted image may refer, for example, to an image made by adding a sepia color tone to the original image. Sepia is a color between yellow and brown, and when applied to an image, sepia may provide a vintage sense to an old photograph. Sepia tones may be applied to black and white photos to add warmth, or the sepia tone may be used to impart a sense of the passage of time to a photo.

At operation 634, the electronic device 101 may determine that the original image is not a tinted image on the basis that the condition of operation 630 is not satisfied.

According to an embodiment, the electronic device 101 may determine that the original image is not a partially colorized image in case that the first index (global colorfulness) has a value equal to or smaller than half the second value, the value of the R channel is equal to or larger than the value of the G channel in all the pixels of the original image, and the value of the G channel is equal to or larger than the value of the B channel in all the pixels of the original image. The second value may include G_max (%).

Figure 7:
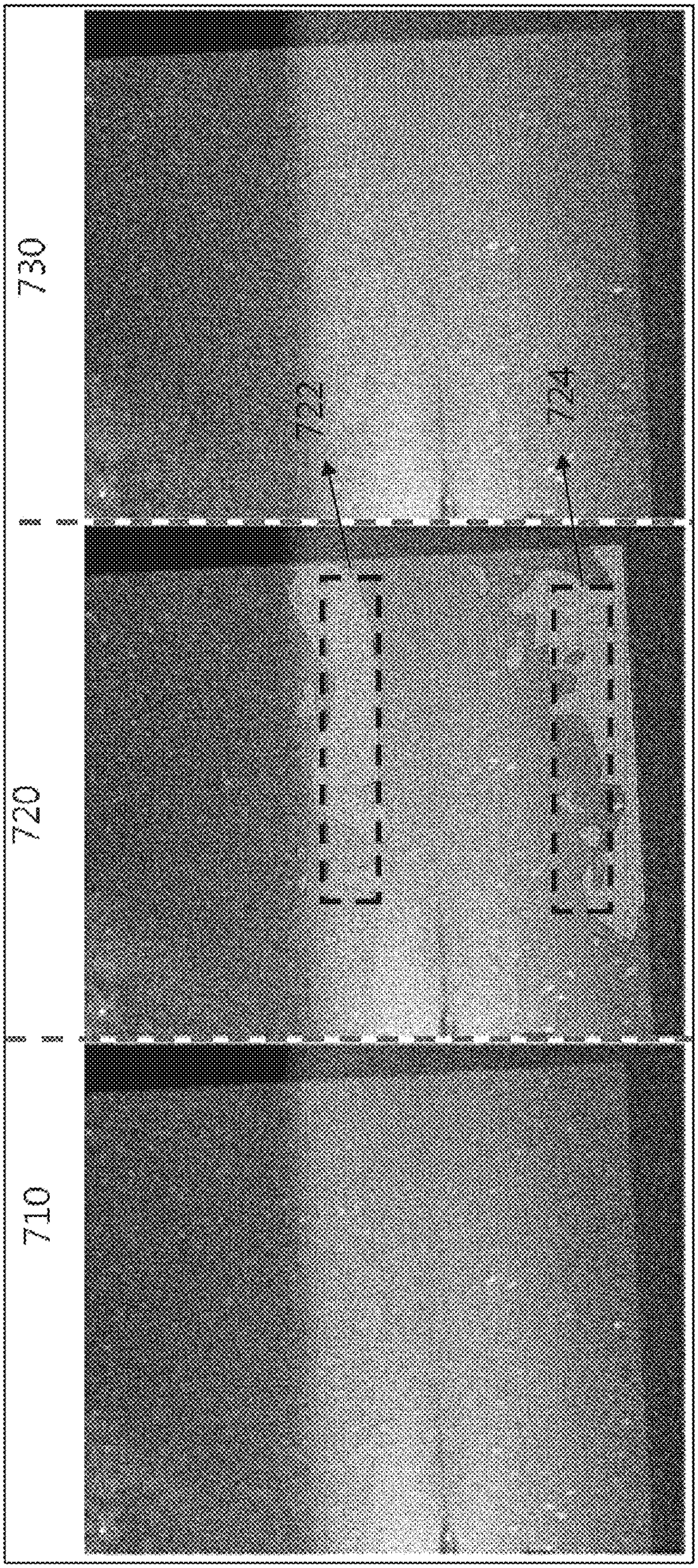
FIG. 7 is a diagram illustrating a situation in which uneven color or smudge occurs during a process of synthesizing an original image and a tinted color image according to various embodiments.

FIG. 7 is a diagram illustrating an example situation in which artifacts occur during a process of synthesizing an original image and a tinted color image according to various embodiments.

Artifacts (e.g., smudges) may occur in case that the background area 424 (e.g., the background area 424 in FIG. 4) is colored and synthesized with the original image in a state in which the background area 424 and the area with an emphasized specific color (e.g., the area 422 with an emphasized specific color in FIG. 4) are not distinguished. During an image synthesis process, the artifacts may refer, for example, to visual effects or errors that are not intended by the user. Artifacts may appear as a mosaic, as unnatural boundary lines, or as smudges that blur the surrounding image.

Picture 710 shows an original image. Picture 720 shows an image created by synthesizing the original image and the color image. The color image may refer, for example, to an image in which the entire area of the original image area is tinted. Picture 730 shows an image improved by applying an algorithm of the present application. Unlike picture 720, artifacts 722 and 724 may not be present in picture 730.

The artifacts 722 and 724, such as smudges, may occur as the original image and the color image are synthesized. The artifacts 722 and 724 may degrade the quality of synthesized images.

The electronic device 101 according to an embodiment may reduce artifacts by obtaining a weighted sum by imparting weights on a pixel-by-pixel basis between the color images in which the entire area of the original image is tinted.

According to an embodiment, the weight corresponding to the original image and the weight corresponding to the color image may be determined by the following method. The electronic device 101 may configure the weight of the pixel, which corresponds to the area classified as gray area in the original image, to 0. The electronic device 101 may configure the weight of the pixel, which corresponds to the area classified by a color, to 1. The pixel, which corresponds to the area classified as a gray area will be referred to as a gray pixel. The pixel, which corresponds to the area classified by a color, will be referred to as a color pixel.

According to an embodiment, the electronic device 101 may calculate the number of color pixels present within a distance (e.g., radius R) designated based on the gray pixel, and the electronic device 101 may calculate 'distance-weight' by dividing the calculated number of color pixels by the overall number of pixels.

The electronic device 101 may calculate a value of 'pixelcolorfulness' of each of the pixels. 'pixelcolorfulness' may be determined as follows. $\text{pixelcolorfulness}=\max(|B-G|,|B-R|,|G-R|)/M$ In this case, M may refer, for example, to a maximum value of a colorfulness value. The value of M may vary depending on the configurations. M may be selected from values within 5% to 10% of 255 that is a maximum value of an 8-bit integer. For example, M may have a value of 15. In a color scheme having a depth of 10 bits, M may be selected from values within 5% to 10% of 1023 that is a maximum value of a 10-bit integer. According to an embodiment, the electronic device 101 may increase a value of M and increase a criterion for colorfulness required to be considered as a partially colorized image.

According to an embodiment, as a value of 'distanceweight' and a value of 'pixelcolorfulness' increase, the electronic device 101 may configure the larger weight corresponding to the original image. As the weight corresponding to the original image increases, the weight corresponding to the color image may relatively decreases. A sum of the weight corresponding to the original image and the weight corresponding to the color image may be 1.

According to an embodiment, the electronic device 101 may synthesize the original image and the color image on the basis of the weight determined in consideration of the value of 'distanceweight' and the value of 'pixelcolorfulness'.

According to an embodiment, the electronic device 101 may change the resolution by decreasing a size (e.g., 512×512) of the original image, obtain the weight, and then synthesize the original image and the color image by applying obtained weight to the size of the original image. In case that the weight is obtained by decreasing the resolution, the amount of computation of the electronic device 101 may be reduced. A method of synthesizing an original image and a color image by the electronic device 101 will be described in greater detail below with reference to FIG. 8.

Figure 8:
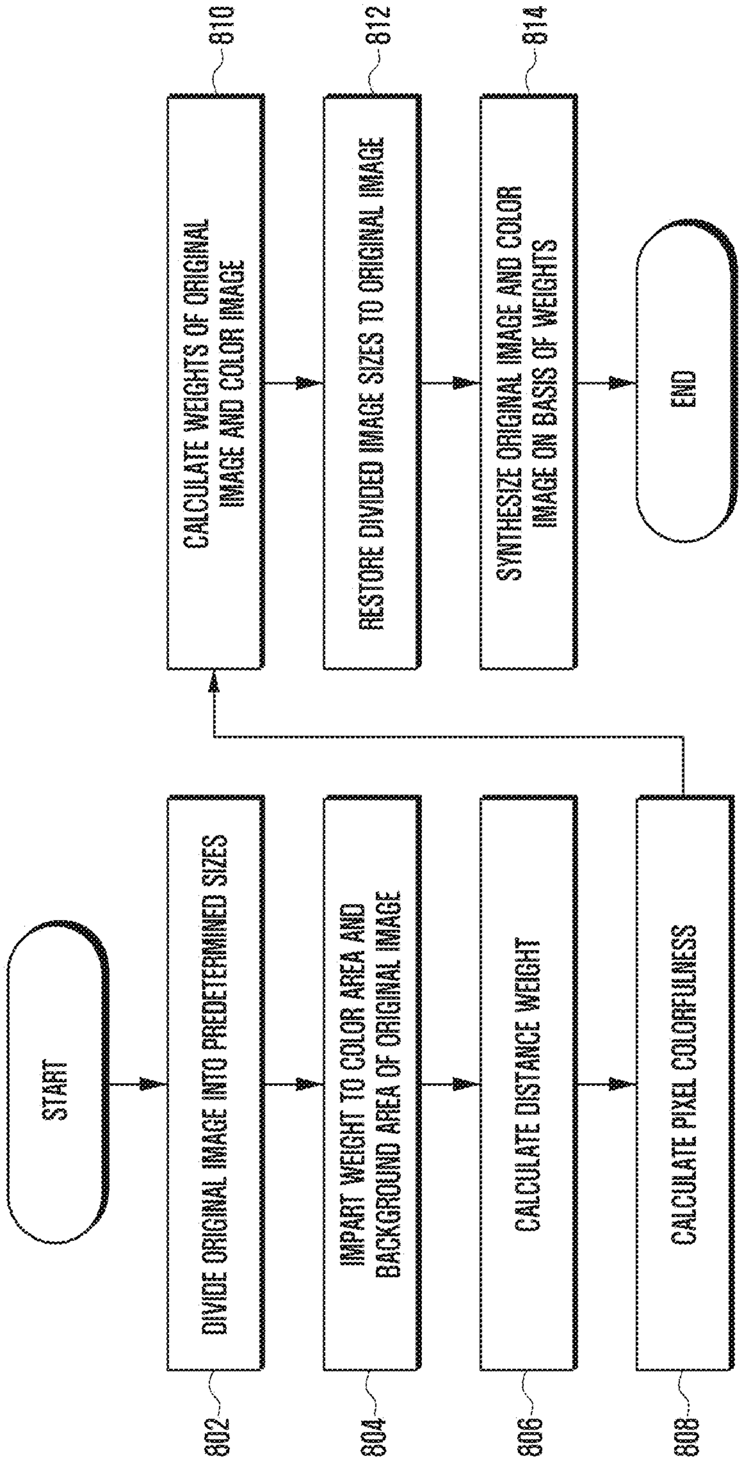
FIG. 8 is a flowchart illustrating an example method of synthesizing an original image and a tinted color image by the electronic device according to various embodiments.

FIG. 8 is a flowchart illustrating an example method of synthesizing an original image and a tinted color image by the electronic device according to various embodiments.

The operations described with reference to FIG. 8 may be implemented on the basis of instructions that may be stored in a computer recording medium or a memory (e.g., the memory 130 in FIG. 1). The illustrated method may be performed by the electronic device (e.g., the electronic device 101 in FIG. 1) described above with reference to FIGS. 1, 2, 3, 4, 5A, 5B, 6 and 7, and a description of the above-mentioned technical feature may not be repeated here. The order of the operations in FIG. 8 may be changed, some operations may be excluded, and some operations may be performed simultaneously.

At operation 802, under the control of the processor (e.g., the processor 120 in FIG. 1), the electronic device 101 may divide the original image into predetermined sizes. Operation 802 is optional and may not be performed by the electronic device 101 depending on the configurations. In this case, the electronic device 101 may perform operation 804 without performing operation 802.

At operation 804, the electronic device 101 may impart the weight to the color area and the background area of the original image. The electronic device 101 according to the present disclosure may reduce artifacts by obtaining a weighted sum by imparting weights on a pixel-by-pixel basis between the color images in which the entire area of the original image is tinted. For example, the weight may have 1 in color and 0 in gray. This is merely an example, and the weight may vary depending on the configurations.

At operation 806, the electronic device 101 may calculate a weight with respect to a distance (distance weight). As described with reference to FIG. 7, 'distanceweight' may refer, for example, to a value made by dividing the calculated number of color pixels by the overall number of pixels. According to an embodiment, the electronic device 101 may calculate the number of color pixels present within a distance (e.g., radius R) designated based on the gray pixel, and the electronic device 101 may calculate 'distanceweight' by dividing the calculated number of color pixels by the overall number of pixels.

At operation 808, the electronic device 101 may calculate colorfulness on a pixel-by-pixel basis. The colorfulness may include the first index (global colorfulness) and the second index (local colorfulness). The first index (global colorfulness) may refer, for example, to a numerical value obtained by quantifying a degree of color richness that a person subjectively feels about the overall image. The second index (local colorfulness) may refer, for example, to an index for measuring color diversity of a specific area (e.g., local patch).

At operation 810, the electronic device 101 may calculate the weight of the original image and the weight of the color image. As the value of 'distanceweight' and the value of 'pixelcolorfulness' increase, the electronic device 101 may configure the larger weight corresponding to the original image. As the weight corresponding to the original image increases, the weight corresponding to the color image may relatively decreases. A sum of the weight corresponding to the original image and the weight corresponding to the color image may be 1.

A final weight (weight for weightForOrigPixel), by which the original color-pop image contributes to a final pixel, may be calculated as follows.

$$weightForOrigPixel = \min(1, distanceWeight + pixelColorfulness)$$

A ratio, by which distanceWeight and pixelColorfulness contribute to final weightForOrigPixel, may be another ratio instead of a ratio of 1:1 (e.g., 3:7) according to various embodiments.

The weight weightForDyedPixel, which contributes to the final Pixel of the pixels of the tinted image, may be a value made by simply subtracting weightForOrigPixel from 1, as follows.

$$weightForDyedPixel = 1 - weightForOrigPixel$$

Each of the pixels of the final resulting image may be determined by the following equation.

$$outPixel = (weightForOrigPixel * origPixel) + (weightForDyedPixel * DyedPixel)$$

Here, origPixel may refer, for example, to a pixel RGB value of an original Color-Pop image. dyedPixel may refer, for example, to an RGB value of each of the pixels of a newly tinted image. outPixel may refer, for example, to an RGB value of a final resulting pixel.

At operation 812, the electronic device 101 may restore the divided image to the size of the original image. In case that the original image is not divided, operation 812 may not be performed, but operation 814 may be performed. According to an embodiment, the electronic device 101 may change the resolution by decreasing a size (e.g., 512×512) of the original image, obtain the weight, and then synthesize the original image and the color image by applying obtained weight to the size of the original image. In case that the weight is obtained by decreasing the resolution, the amount of computation of the electronic device 101 may be reduced.

At operation 814, the electronic device 101 may synthesize the original image and the color image on the basis of the weight.

According to an embodiment, the electronic device 101 may determine a first area which is emphasized by a specific color and classified by a color, and a second area classified as having a black-and-white background or a monochrome background on the basis that the input original image is identified as a partially colorized image. The electronic device 101 may calculate the overall number of pixels within a radius R designated based on any one pixel positioned in the second area and calculate the number of pixels which is emphasized by a specific color and classified by a color. The electronic device 101 may calculate a ratio of all the pixels and the pixels classified by a color, and the electronic device 101 may determine the colorfulness of any one pixel on the basis of an absolute value of a difference between R, G, and B values in any one pixel. The electronic device 101 may determine the weight corresponding to the original image on the basis of the ratio (distanceweight) of all the pixels and the pixel classified by a color and the colorfulness (pixelcolorfulness) of any one pixel.

Figure 9:
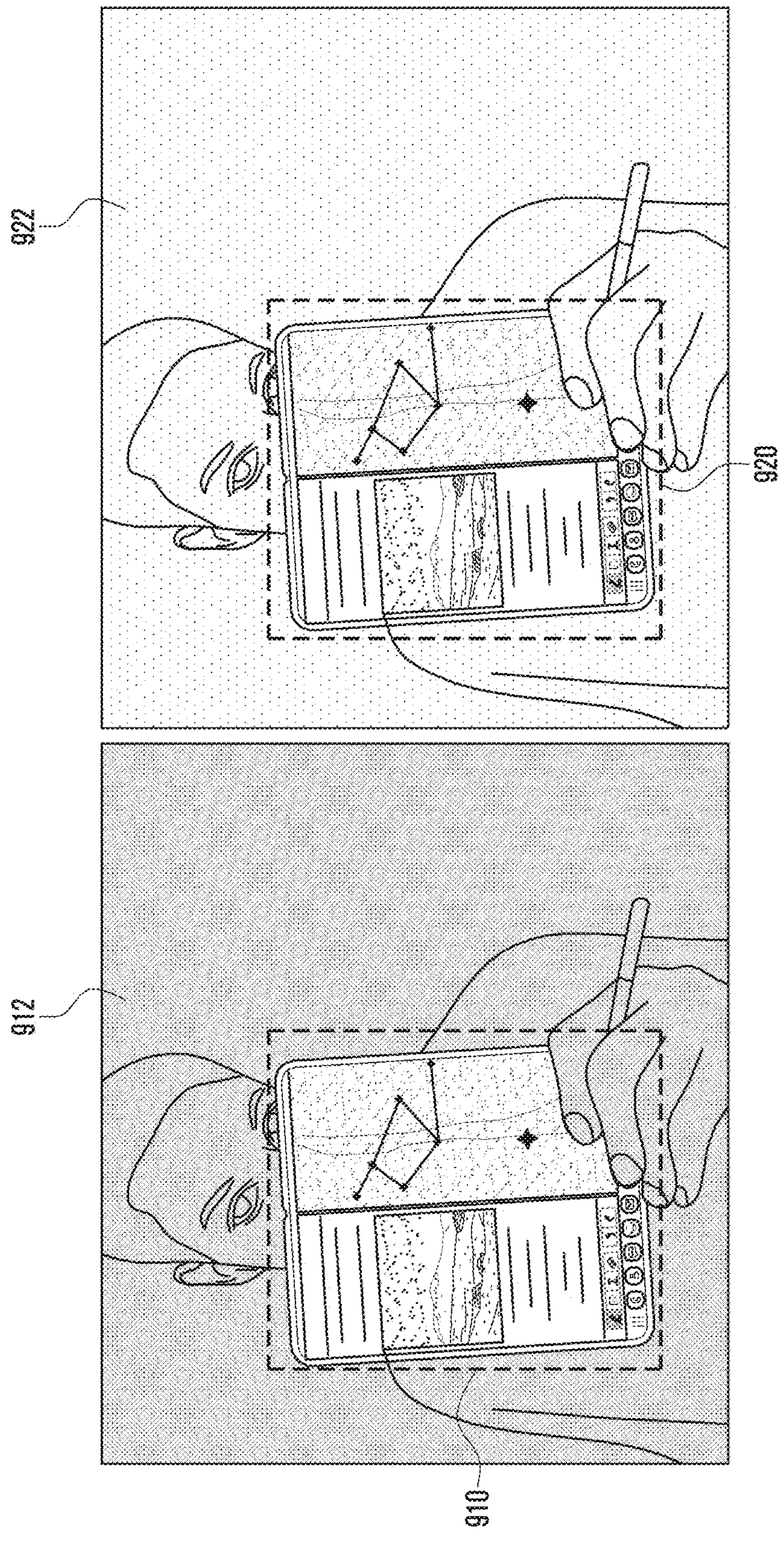
FIG. 9 is a diagram illustrating a result of performing synthesis on a partially colorized image according to various embodiments.

FIG. 9 is a diagram illustrating a result of performing synthesis on a partially colorized image according to various embodiments.

According to an embodiment, a first area 910 may refer, for example, to an area with an emphasized specific color in the partially colorized image. A second area 912 may refer, for example, to a black-and-white background area or a monochrome background area.

According to an embodiment, the electronic device (e.g., the electronic device 101 in FIG. 1) may create a tinted color image in the entire area of the original image under the control of the processor (e.g., the processor 120 in FIG. 1). The electronic device 101 may synthesize the created color image and the original image. The synthesized image may include a third area 920 and a fourth area 922. Like the first area 910, the third area 920 may refer, for example, to an area with an emphasized specific color in the partially colorized image. The electronic device 101 may perform control to prevent/reduce a loss of the unique color of the first area 910 while synthesizing the created color image and the original image. The fourth area 922 may refer, for example, to a background area made by colorizing the second area 912 with a specific tone.

According to a comparative embodiment, the unique color of the first area 910 may be lost during a process of colorizing the second area 912. The electronic device 101 according to various embodiments may perform control to prevent/reduce a loss of the unique color of the first area 910 during the process of colorizing the second area 912.

Figure 10A:
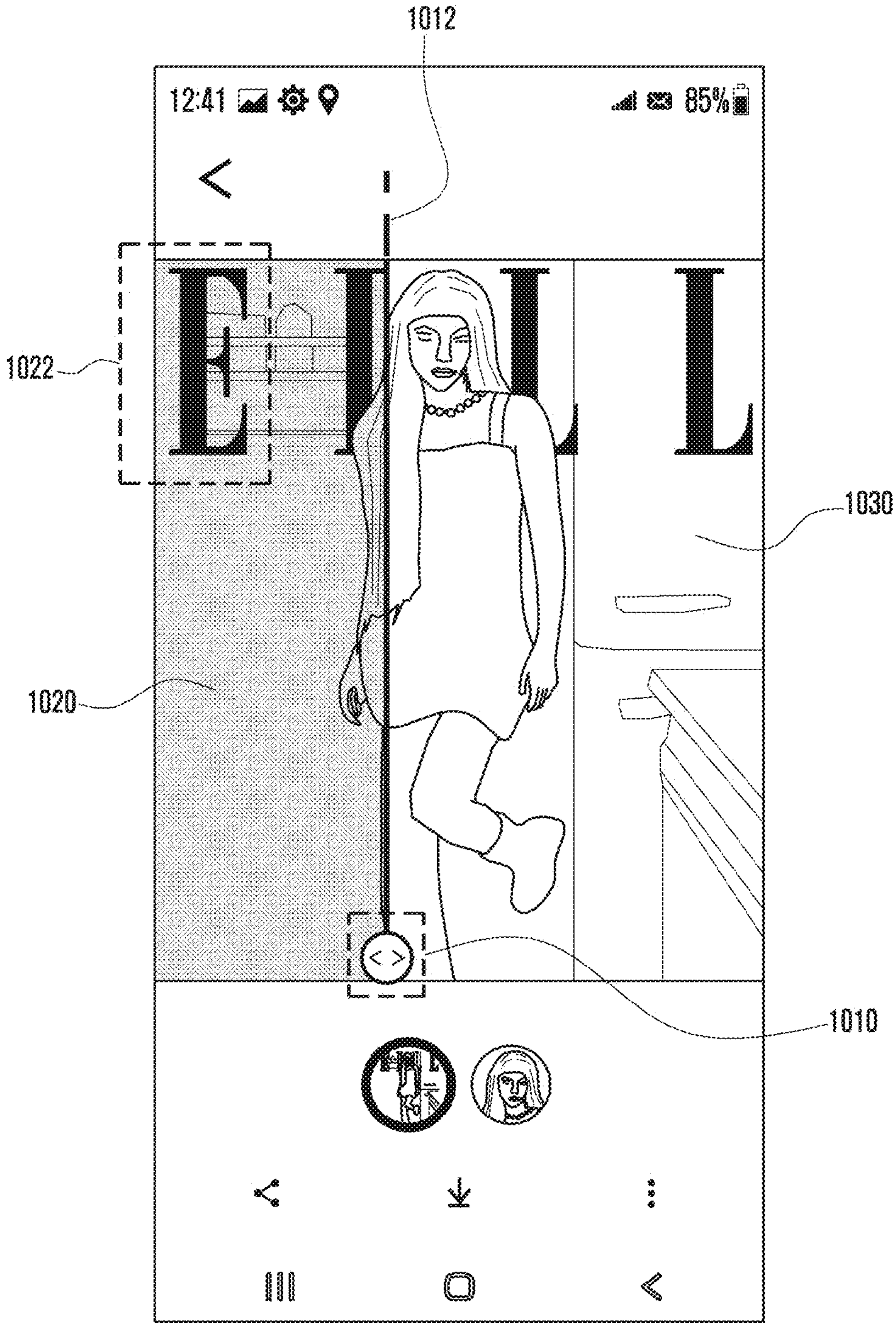
FIGS. 10A and 10B are diagrams illustrating screens displaying indicators for allowing the electronic device to identify and colorize a partially colorized image according to various embodiments.
Figure 10B:
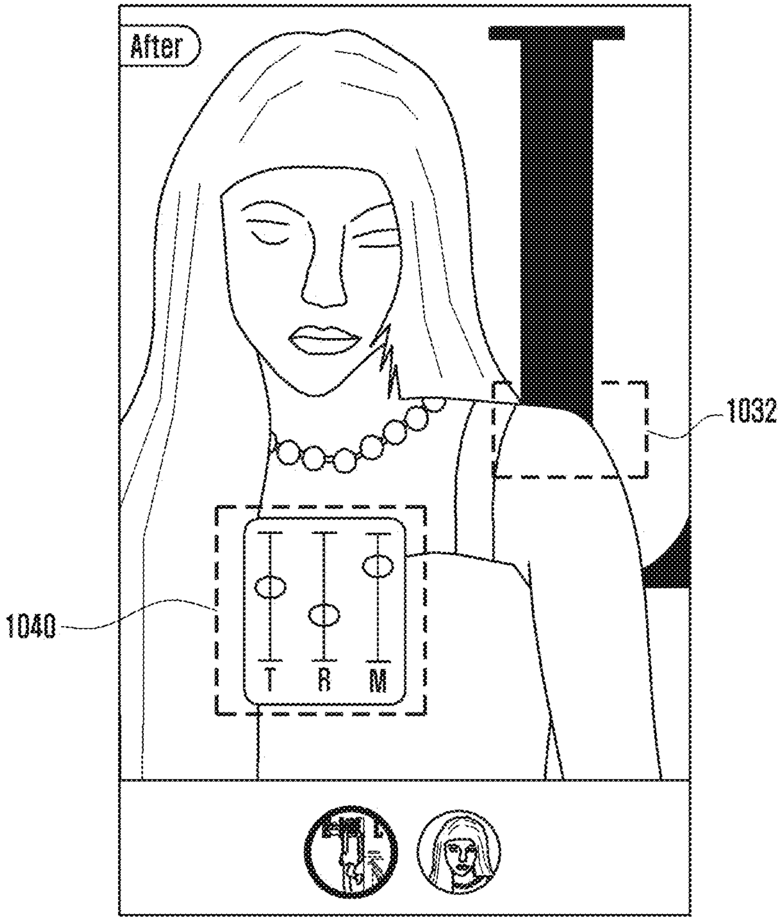

FIGS. 10A and 10B are diagrams illustrating screens displaying indicators for allowing the electronic device to identify and colorize a partially colorized image according to various embodiments.

In FIG. 10A, the electronic device (e.g., the electronic device 101 in FIG. 1) may display a partially colorized image and an indicator for colorization on the display under the control of the processor (e.g., the processor 120 in FIG. 1). The UI described with reference to FIGS. 10A and 10B may be applied to a general smartphone as well as a configuration having a shape of a smartphone and having a flexible display.

According to an embodiment, the electronic device 101 may display a partially colorized image and display a first indicator 1010 capable of moving in the image. The description will be made on the assumption that the indicator 1010 in FIG. 10A moves leftward and rightward. However, the motion of the first indicator 1010 is not limited thereto. For example, the first indicator 1010 may move upward and downward or move along a diagonal line. The motion of the first indicator 1010 may vary depending on the configurations.

According to an embodiment, based on the first indicator 1010 that moves leftward and rightward, the electronic device 101 may display a line 1012 that divides the partially colorized image into two areas. The partially colorized image may include a background area 1020 positioned at the left side based on the position of the line 1012, and a color area 1030 positioned at the right side based on the position of the line 1012.

According to an embodiment, the background area 1020 may refer, for example, to an area displayed in gray in the partially colorized image. The background area may refer, for example, to an area of the partially colorized image in which contrast is lower than a designated level. The background area 1020 may include a portion 1022 with an emphasized specific color on the partially colorized image. In FIG. 10A, the portion 1022 with an emphasized specific color may include an alphabet 'E' shape and displayed to have an emphasized specific color, unlike the background area.

According to an embodiment, the background area 1020 may be displayed in an original image state of the partially colorized image. The color area 1030 may be displayed in a state in which a tinted color image is synthesized with the original image of the partially colorized image and the entire area of the partially colorized image.

According to an embodiment, the electronic device 101 may display the indicator 1010 and adjust a size of a portion displayed as the background area 1020 and a size of a portion displayed as the color area 1030 on the basis of the user input on the first indicator 1010. The electronic device 101 may display both the original image of the partially colorized image and the image with the colored background by adjusting the size of the portion displayed as the background area 1020 and the size of the portion displayed as the color area 1030.

In FIG. 10B, the electronic device 101 may display a second indicator 1040 for adjusting parameters T, R, and M related to color synthesis. In FIG. 10B, the second indicator 1040 is illustrated in the form of a slider bar. However, the shape of the second indicator 1040 is not limited thereto. The second indicator 1040 may include any shape as long as the shape adjusts values of a plurality of parameters.

In FIG. 10B, a mixture area 1032 may refer, for example, to an area in which a part of the portion with an emphasized specific color (e.g., the portion 1022 with an emphasized specific color in FIG. 10A) and a part of the area (e.g., the background area 1020) with no emphasized specific color adjoin a boundary line.

According to an embodiment, the electronic device 101 may colorize the area with no emphasized specific color and then perform the synthesis while maintaining the color of the portion with an emphasized specific color with respect to the mixture area 1032. In this case, in case that the portion with an emphasized specific color is colorized, the original color may change. In case that the area with no emphasized specific color is not colorized, artifacts may occur during the process of synthesizing the original image. For example, in case that the area with no emphasized specific color is not colorized, bleeding may occur as the area with no emphasized specific color is synthesized with the area with the emphasized specific color. The bleeding may refer, for example, to a phenomenon in which a color of one image permeates into an adjacent area. The bleeding may occur in an intermediate area between the background area and the area with an emphasized specific color. In FIG. 4, the intermediate area (e.g., the intermediate area 420 in FIG. 4) between the background area (e.g., the background area 424 in FIG. 4) and the area with an emphasized specific color (e.g., the area 422 with an emphasized specific color) has been described.

According to an embodiment, the electronic device 101 may display the second indicator 1040 to prevent/reduce the original color from changing or prevent/reduce artifacts from occurring. The electronic device 101 may adjust values of the parameters T, R, and M for the color synthesis on the basis of the user input related to the second indicator 1040 and prevent/reduce the change in color of the emphasized portion of the original image or the occurrence of artifacts in the synthesized image.

According to an embodiment, the parameter T may refer, for example, to the first level T described with reference to FIG. 4. According to an embodiment, the pixel, in which an absolute value of a difference between the R, G, and B channels is larger than a predetermined value, may be referred to as the 'color pixel'. The color pixel may refer, for example, to the pixel in which a maximum size of the absolute value of the difference between the R, G, and B channels is larger than a first level (e.g., T). The first level T may refer, for example, to a parameter for determining the number of color pixels. The number of pixels, which are classified as the color pixels, may decrease as the parameter T increases. The number of pixels classified as gray pixels may increase as the number of pixels classified as color pixels decreases. The 'distanceweight' may decrease as the number of pixels classified as color pixels decreases. The magnitude of the weight corresponding to the original image may decrease as the 'distanceweight' decreases. For example, the electronic device 101 may perform control to obtain different output results of synthetic images by adjusting the magnitude of the weight corresponding to the original image on the basis of the user input related to the parameter T.

According to an embodiment, the parameter R may refer, for example, to a radius R used to calculate the 'distanceweight'. In case that the radius R changes, the overall number of pixels and the overall number of color pixels are changed, such that the 'distanceweight' may change. In case that the value of the parameter R increases, the overall number of pixels may increase. In case that the value of the parameter R increases, the number of color pixels may increase. In case that the increase rate is relatively higher than the increase rate of the overall pixels, the 'distanceweight' may become larger than before. The magnitude of the weight corresponding to the original image may increase as the 'distanceweight' increases. In contrast, in case that the parameter R increases, the overall number of pixels may increase. In this case, in case that the increase rate of the number of color pixels is relatively lower the increase rate of the overall pixels, the 'distanceweight' may become smaller than before. The magnitude of the weight corresponding to the original image may decrease as the 'distanceweight' decreases.

According to an embodiment, the parameter M may refer, for example, to a maximum value of a colorfulness value. M may be selected from values within 5% to 10% of 255 that is a maximum value of an 8-bit integer. For example, M may have a value of 15. In a color scheme having a depth of 10 bits, M may be selected from values within 5% to 10% of 1023 that is a maximum value of a 10-bit integer. The 'pixelcolorfulness' may decrease as the parameter M increases. When the magnitude of the 'pixelcolorfulness' decreases, the magnitude of the weight corresponding to the original image may decrease. That is, the electronic device 101 may perform control to obtain different output results of synthetic images by adjusting the magnitude of the weight corresponding to the original image on the basis of the user input related to the parameter M.

According to an embodiment, the parameters related to the color synthesis may include a first parameter T corresponding to a criterion related to a magnitude of an absolute value of a difference between the R, G, and B channels, a second parameter R for determining a radius of an area that is a sample in the image, and a third parameter M indicating a maximum value of a colorfulness value. The type of parameter related to the color synthesis displayed on the second indicator 1040 may vary depending on the user input.

The electronic device 101 may determine different weights for respective parameters on the basis of the user input to the second indicator 1040. The weight may have a value of 0 or more and 1 or less. This is just an example, and the value of the weight may vary depending on the configurations.

Figure 11:
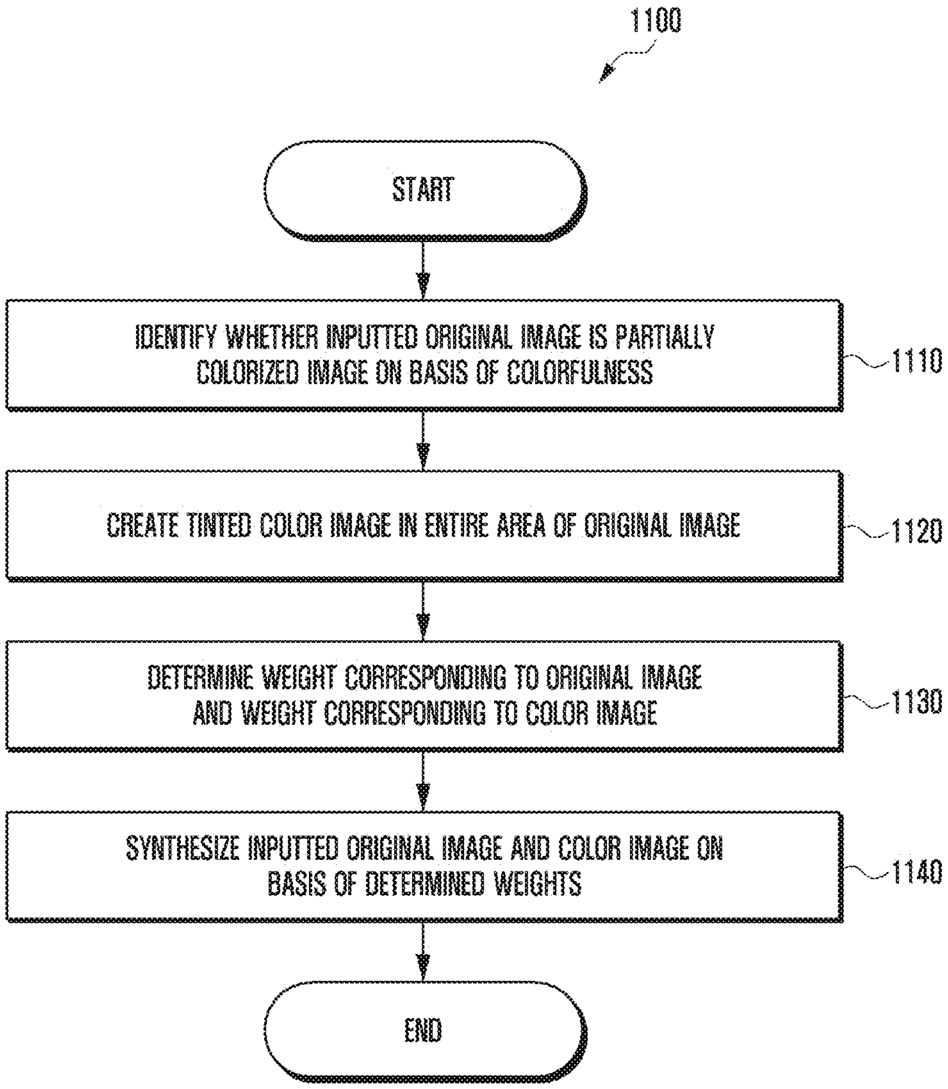
FIG. 11 is a flowchart illustrating an example method of identifying and colorizing a partially colorized image by the electronic device according to various embodiments.

FIG. 11 is a flowchart illustrating an example method of identifying and colorizing a partially colorized image by the electronic device according to various embodiments.

The operations described with reference to FIG. 11 may be implemented on the basis of instructions that may be stored in a computer recording medium or a memory (e.g., the memory 130 in FIG. 1). An illustrated method 1100 may be performed by the electronic device (e.g., the electronic device 101 in FIG. 1) described above with reference to FIGS. 1, 2, 3, 4, 5A, 5B, 6, 7, 8, 9, 10A and 10B, and a description of the above-mentioned technical feature may not be repeated here. The order of the operations in FIG. 11 may be changed, some operations may be excluded, and some operations may be performed simultaneously.

At operation 1110, the electronic device 101 may identify whether the input original image is a partially colorized image on the basis of the colorfulness under the control of the processor (e.g., the processor 120 in FIG. 1).

According to an embodiment, the colorfulness may include a first index made by quantifying the colorfulness for the entire area of the original image, and a second index made by quantifying the colorfulness for the specific area of the original image. When the partially colorized image has a black-and-white background or a monochrome background, the partially colorized image may include an image in which a color of a specific area is emphasized.

At operation 1120, the electronic device 101 may create a tinted color image in the entire area of the original image.

According to an embodiment, the electronic device 101 may create a tinted color image in the original overall image using a color histogram predictor, a histogram encoder, and a color generator.

The color histogram predictor may be used to predict the color histogram of the specific image. The color histogram may refer, for example, to a distribution that shows how often each color appears in an image. The color histogram predictor may receive an image and predict the color histogram of the corresponding image. The electronic device 101 may recognize a color distribution of the original image using the color histogram predictor.

The histogram encoder may be used to encode the color histogram predicted by the color histogram predictor. Encoding may refer to a process of converting histogram information into a format that a computer may understand. The encoded information may be transferred to the color generator.

The color generator may be used to create a new color image using the information encoded by the histogram encoder. For example, the color generator may use a generative model such as generative adversarial networks (GANs). GAN may refer to a model that generates fake images that resemble real images. The color generator may create a new color image while maintaining a color distribution of the original image using the encoded information.

At operation 1130, the electronic device 101 may determine a weight corresponding to the original image and a weight corresponding to the color image. An example process of determining the weight has been described in detail above with reference to FIGS. 7 and 8.

At operation 1140, the electronic device 101 may synthesize the created color image and the original image on the basis of the determined weights.

According to an embodiment, in case that the first index has a value equal to or larger than the first value and smaller than the second value relatively larger than the first value, the second index has a value larger than the third value, and a difference between the second index and the first index is larger than the fourth value, the electronic device 101 may determine that the original image is a partially colorized image under the control of the processor 120. The first value may include G_min (%). The second value may include G_max (%). The third value may include L_max (%). The fourth value may include a value made by multiplying the value of the first index A by a specific ratio.

According to an embodiment, the electronic device 101 may determine a specific area by physically equally dividing the entire area of the original image and calculate the second index. The electronic device 101 may classify each pixel in the image into any class using semantic segmentation in the original image, determine pixels corresponding to a predetermined interest object on the basis of the classified class, determine an area, in which the pixels corresponding to the interest object are positioned, as a specific area, and calculate the second index. The second index may refer, for example, an index made by quantifying the colorfulness of the specific area of the original image or an index (local colorfulness) made by quantifying a degree of color richness perceived for the specific area.

According to an example embodiment, and electronic device may include: at least one display, at least one processor, comprising processing circuitry, and a memory configured to store instructions. The instructions, when executed by at least one processor, individually and/or collectively, may cause the electronic device to: allow the electronic device to identify whether an input original image is a partially colorized image with an emphasized specific color in a black-and-white background or a monochrome background on the basis of colorfulness, create a tinted color image in an entire area of the original image, determine a weight corresponding to the original image and a weight corresponding to the color image, and synthesize the input original image and the color image on the basis of the determined weights.

According to an example embodiment, the electronic device may determine that the original image is the partially colorized image when a first index has a value equal to or larger than a first value and smaller than a second value larger than the first value, a second index is larger than a third value, and a difference between the second index and the first index is larger than a fourth value.

The second index may be made by quantifying a degree of color richness perceived for a specific area of the original image. The instructions, when executed by at least one processor, individually and/or collectively, may cause the electronic device to: allow the electronic device to physically equally divide the entire area of the original image, determine the specific area, and calculate the second index, or to classify the pixel in the image into any class using semantic segmentation in the original image, determine pixels corresponding to a specified interest object on the basis of the classified class, determine an area, in which the pixels corresponding to the interest object are positioned, as the specific area, and calculate the second index.

According to an example embodiment, the instructions, when executed by at least one processor, individually and/or collectively, may cause the electronic device to: allow the electronic device to increase the first value to decrease the probability that the original image is classified as the partially colorized image or increase the second value to increase the probability that the original image is classified as the partially colorized image.

According to an example embodiment, the instructions, when executed by at least one processor, individually and/or collectively, may cause the electronic device to: allow the electronic device to increase the third value and the fourth value to increase the influence of the second index during the process of classifying the original image as the partially colorized image. The increase in the influence of the second index may refer, for example, to an increase in the degree of color richness in the specific area.

According to an example embodiment, the colorfulness may include a first index made by quantifying the colorfulness for the entire area of the original image, and a second index made by quantifying the colorfulness for the specific area of the original image. The instructions, when executed by at least one processor, individually and/or collectively, may cause the electronic device to: allow the electronic device to determine that the original image is the partially colorized image based on the first index having a value equal to or greater than the first value and less than the second value greater than the first value, the second index is greater than the third value, the difference between the second index and the first index is greater than the fourth value, and a proportion of the pixel, in which an absolute value of a difference between R, G, and B channels is greater than a specified value in comparison with all the pixels that occupy the entire area of the original image, is less than the second value.

According to an example embodiment, the instructions, when executed by at least one processor, individually and/or collectively, may cause the electronic device to allow the electronic device to create a tinted color image in the second area using a color histogram predictor, a histogram encoder, and/or a color generator.

According to an example embodiment, the instructions, when executed by at least one processor, individually and/or collectively, may cause the electronic device to: determine a first area emphasized by a specific color and classified by a color, and a second area classified as having a black-and-white background or a monochrome background on the basis that the input original image is identified as a partially colorized image. The electronic device may be configured to: calculate the overall number of pixels in a radius designated based on any one pixel positioned in the second area, calculate the number of pixels that are emphasized by a specific color and classified by a color, and calculate a ratio of all the pixels and the pixel classified by a color. The electronic device may be configured to: determine colorfulness of any one pixel on the basis of an absolute value of a difference between R, G, and B values in any one pixel, and determine a weight corresponding to the original image on the basis of the ratio of all the pixels and the pixel classified by a color and the colorfulness of any one pixel.

According to an example embodiment, the instructions, when executed by at least one processor, individually and/or collectively, may cause the electronic device to: determine the weight of the color image so that a sum of the weight corresponding to the original image and the weight corresponding to the color image is 1, and synthesize the input original image and the color image on the basis of the weight corresponding to the original image and the weight of the color image.

According to an example embodiment, an electronic device may include at least one display, at least one processor, comprising processing circuitry, and a memory configured to store instructions. The colorfulness may include the first index made by quantifying the colorfulness for the entire area of the original image, and the second index made by quantifying the colorfulness for the specific area of the original image. The instructions, when executed by at least one processor, individually and/or collectively, may cause the electronic device to: identify whether an input original image is a partially colorized image with an emphasized specific color in a black-and-white background or a monochrome background on the basis of colorfulness, and determine that the original image is the partially colorized image based on a first index has a value equal to or greater than a first value and less than a second value larger than the first value, a second index being larger than a third value, and a difference between the second index and the first index being greater than a fourth value.

According to an example embodiment, a method of operating an electronic device may include: identifying whether an input original image is a partially colorized image with an emphasized specific color in a black-and-white background or a monochrome background on the basis of colorfulness, creating a tinted color image in an entire area of the original image, determining a weight corresponding to the original image and a weight corresponding to the color image, and synthesizing the input original image and the color image on the basis of the determined weight.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:

a display;

at least one processor, comprising processing circuitry; and memory storing instructions that, when executed by the at least one processor, individually and/or collectively, cause the electronic device to:

identify whether an original image includes a colored image area and a black-and-white image area based on colorfulness parameters;

generate a color image wherein an entire area of the original image is colored;

determine, on a pixel-by-pixel basis, weight values corresponding to pixels of the original image and weight values corresponding to pixels of the color image; and synthesize the original image and the color image on the pixel-by-pixel basis, based on the weight values corresponding to the pixels of the original image and the weight values corresponding to the pixels of the color image, wherein the weight values corresponding to the pixels of the original image are determined for a respective pixel of the original image based on both a ratio of pixels classified as colored pixels to all pixels within a specified radius with reference to the respective pixel and a colorfulness of the respective pixel.

2. The electronic device of claim 1, wherein the colorfulness parameters comprise:

a first index quantifying colorfulness for the entire area of the original image; and a second index quantifying colorfulness for a specific area of the original image, and wherein the instructions, when executed by at least one processor comprising processing circuitry, individually and/or collectively, cause the electronic device to identify that the original image includes the colored image area based on the first index having a value greater than or equal to a first value and less than a second value relatively greater than the first value, and the second index being greater than a third value and having a difference from the first index of more than a fourth value.

3. The electronic device of claim 2, wherein the second index is characterized by quantifying of colors for the specific area of the original image, and wherein the instructions, when executed by at least one processor comprising processing circuitry, individually and/or collectively, cause the electronic device to:

uniformly divide the entire area of the original image to determine the specific area and calculate the second index;

classify each pixel within the original image into a class using semantic segmentation within the original image;

determine pixels corresponding to objects of interest, based on classes according to the classifying; and determine an area in which the pixels corresponding to the objects of interest are located as the specific area and calculate the second index.

4. The electronic device of claim 2, wherein the instructions, when executed by at least one processor comprising processing circuitry, individually and/or collectively, cause the electronic device to:

decrease a probability that the original image is identified as including the colored image area, by increasing the first value; and increase the probability that the original image is identified as including the colored image area, by increasing the second value.

5. The electronic device of claim 2, wherein the instructions, when executed by at least one processor comprising processing circuitry, individually and/or collectively, cause the electronic device to increase influence of the second index during the identifying of the original image as including the colored image area, by increasing the third value or the fourth value, and wherein greater influence of the second index indicates that richness of colors in the specific area is larger.

6. The electronic device of claim 1, wherein the colorfulness parameters comprise:

a first index quantifying colorfulness for the entire area of the original image; and a second index quantifying colorfulness for a specific area of the original image, and wherein the instructions, when executed by at least one processor comprising processing circuitry, individually and/or collectively, cause the electronic device to identify that the original image includes the colored image area based on the first index having a value greater than or equal to a first value and less than a second value greater than the first value, the second index is greater than a third value and has a difference from the first index by more than a fourth value, and a ratio of pixels having an absolute value of a difference between red (R), green (G), and blue (B) channels greater than a specified value is less than the second value through comparison with all pixels in the entire area of the original image.

7. The electronic device of claim 1, wherein the instructions, when executed by at least one processor comprising processing circuitry, individually and/or collectively, cause the electronic device to generate the color image using a color histogram predictor, a histogram encoder, and/or a color generator.

8. The electronic device of claim 1, wherein the instructions, when executed by at least one processor comprising processing circuitry, individually and/or collectively, cause the electronic device to:

based on the original image being identified as including the colored image area, determine a first area emphasized by a specific color and classified as a colored area, and a second area classified as having a black-and-white background or a monochrome background;

calculate, on a pixel-by-pixel basis, within a specified radius with reference to each respective pixel located in the second area, a number of all pixels and a number of pixels each emphasized by a specific color and classified as a colored pixel;

calculate for each respective pixel located in the second area a ratio of pixels classified as colored pixels to all pixels within the specified radius;

determine colorfulness of the each respective pixel in the second area, based on an absolute value of a difference between red (R), green (G), and blue (B) values within each respective pixel; and determine the weight values corresponding to pixels of the original image, based on both the ratio of the pixels classified as the colored pixels to all pixels for the respective pixels in the second area and the colorfulness of the respective pixels in the second area.

9. The electronic device of claim 8, wherein the instructions, when executed by at least one processor comprising processing circuitry, individually and/or collectively, cause the electronic device to:

determine weights of the color image so that a sum of a weight corresponding to a respective pixel the original image and the weight corresponding to a respective pixel the color image, which corresponds to the respective pixel of the original image, is 1; and synthesize the original image and the color image, based on the weights corresponding to pixels of the original image and weights of pixels of the color image.

10. The electronic device of claim 2, wherein the instructions, when executed by at least one processor comprising processing circuitry, individually and/or collectively, cause the electronic device to identify that the original image does not include the colored image area based on the first index having a value equal to or less than half of the second value, a value of an R channel being greater than or equal to a value of a G channel in all pixels of the original image, and the value of the G channel being greater than or equal to a value of a B channel in all pixels of the original image.

11. An electronic device comprising:

at least one display;

at least one processor, comprising processing circuitry; and memory configured to store instructions, wherein the instructions, when executed by the at least one processor, individually and/or collectively, cause the electronic device to:

identify whether an input original image is a partially colorized image with an emphasized specific color in a black-and-white background or a monochrome background based on colorfulness, wherein the colorfulness comprises a first index based on quantifying colorfulness for an entire area of an original image and a second index based on quantifying colorfulness for a specific area of the original image;

identify that the original image is the partially colorized image based on the first index having a value equal to or greater than a first value and less than a second value greater than the first value, the second index being greater than a third value, and a difference between the second index and the first index being greater than a fourth value;

generate a color image wherein entire area of the original image is colored;

determine weight values corresponding to pixels of the original image and weight values corresponding to pixels of the color image on a pixel-by-pixel basis, wherein a weight corresponding to a respective pixel of the original image is determined based on a ratio of pixels classified as colored pixels to all pixels within a specified radius with reference to the respective pixel, and a colorfulness of the respective pixel; and synthesize the input original image and the color image on the pixel-by-pixel basis, based on the weight values corresponding to the pixels of the original image and the weight values corresponding to the pixels of the color image.

12. The electronic device of claim 11, wherein the second index quantifies the colorfulness of the specific area of the original image, and wherein the instructions, when executed by at least one processor comprising processing circuitry, individually and/or collectively, cause the electronic device to equally divide an entire area of the original image, determine the specific area, and calculate the second index, or to classify a pixel in the image into any class using semantic segmentation in the original image, determine pixels corresponding to a specified interest object based on the classified class, determine an area, in which the pixels corresponding to the interest object are positioned, as the specific area, and calculate the second index.

13. The electronic device of claim 12, wherein the instructions, when executed by at least one processor comprising processing circuitry, individually and/or collectively, cause the electronic device to increase the first value to decrease a probability that the original image is identified as the partially colorized image or increase the second value to increase the probability that the original image is identified as the partially colorized image.

14. The electronic device of claim 12, wherein the instructions, when executed by at least one processor comprising processing circuitry, individually and/or collectively, cause the electronic device to increase the third value and the fourth value to increase influence of the second index during the process of identifying the original image as the partially colorized image, and wherein an increase in the influence of the second index indicates an increase in a degree of color richness in the specific area.

15. The electronic device of claim 12, wherein the instructions, when executed by at least one processor comprising processing circuitry, individually and/or collectively, cause the electronic device to identify that the original image is the partially colorized image based on the first index having a value equal to or greater than the first value and less than the second value larger than the first value, the second index being greater than the third value, the difference between the second index and the first index being greater than the fourth value, and a proportion of the pixel, in which an absolute value of a difference between red (R), green (G), and blue (B) channels being greater than a specified value in comparison with all the pixels that occupy the entire area of the original image, is smaller than the second value.

16. The electronic device of claim 12, wherein the instructions, when executed by at least one processor comprising processing circuitry, individually and/or collectively, cause the electronic device to: divide the image into two areas based on a first indicator, display a first area of the two areas based on the first indicator in an original image state of the partially colorized image, display a second area of the two areas based on the first indicator in a state in which a tinted color image is synthesized with the original image of the partially colorized image and the entire area of the partially colorized image, and adjust sizes of the first and second areas based on an input to the first indicator.

17. The electronic device of claim 16, wherein the instructions, when executed by at least one processor comprising processing circuitry, individually and/or collectively, cause the electronic device to: display a second indicator, and adjust a parameter value for color synthesis based on an input to the second indicator, wherein parameters related to the color synthesis comprise:

a first parameter (T) corresponding to a criterion related to a magnitude of an absolute value of a difference between the R, G, and B channels;

a second parameter (R) for determining a radius of an area that is a sample in the image; and a third parameter (M) indicating a maximum value of a colorfulness value, wherein a type of parameter related to the color synthesis displayed on the second indicator varies depending on configurations.

18. The electronic device of claim 17, wherein the instructions, when executed by at least one processor comprising processing circuitry, individually and/or collectively, cause the electronic device to differently determine weights for respective parameters based on the input to the second indicator, and wherein the weight has a value of 0 or more and 1 or less.

19. A method of operating an electronic device, the method comprising:

identifying whether an input original image is a partially colorized image with an emphasized specific color in a black-and-white background or a monochrome background based on colorfulness;

creating a tinted color image in an entire area of the original image;

determining, on a pixel-by-pixel basis, weight values corresponding to pixels of the original image and weight values corresponding to pixels of the color image; and synthesizing the original image and the color image on the pixel-by-pixel basis, based on the weight values corresponding to the pixels of the original image and the weight values corresponding to the pixels of the color image, wherein the weight values corresponding to the original image are determined for a respective pixel of the original image based on both a ratio of pixels classified as colored pixels to all pixels within a specified radius with reference to the respective pixel and a colorfulness of the respective pixel.

20. The method of claim 19, wherein the colorfulness comprises:

a first index quantifying colorfulness for an entire area of the original image; and a second index quantifying colorfulness for a specific area of the original image, and wherein the identifying of whether the input original image is the partially colorized image further comprises:

identifying that the original image is the partially colorized image based on a first index having a value equal to or greater than a first value and less than a second value greater than the first value, a second index being greater than a third value, and a difference between the second index and the first index being greater than a fourth value.

* * * * *